United States Patent
Nishiyama et al.

(10) Patent No.: US 9,925,935 B2
(45) Date of Patent: Mar. 27, 2018

(54) IN-VEHICLE COMMUNICATION SYSTEM AND IN-VEHICLE COMMUNICATION METHOD

(75) Inventors: Hirohito Nishiyama, Tokyo (JP); Masuo Ito, Tokyo (JP); Keisuke Morita, Tokyo (JP); Yuichi Tokunaga, Tokyo (JP); Daisuke Tanimoto, Tokyo (JP); Shigekazu Okamura, Tokyo (JP); Hiroyuki Tsuji, Tokyo (JP); Mitsuhiro Mimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 425 days.

(21) Appl. No.: 14/419,356

(22) PCT Filed: Aug. 24, 2012

(86) PCT No.: PCT/JP2012/071381
§ 371 (c)(1),
(2), (4) Date: Feb. 3, 2015

(87) PCT Pub. No.: WO2014/030247
PCT Pub. Date: Feb. 27, 2014

(65) Prior Publication Data
US 2015/0217706 A1 Aug. 6, 2015

(51) Int. Cl.
G06F 13/42 (2006.01)
B60R 16/023 (2006.01)
H04L 29/08 (2006.01)

(52) U.S. Cl.
CPC ........ *B60R 16/023* (2013.01); *G06F 13/4221* (2013.01); *H04L 67/12* (2013.01)

(58) Field of Classification Search
None
See application file for complete search history.

(56) References Cited

U.S. PATENT DOCUMENTS 4,939,725 A 7/1990 Matsuda et al.
5,974,351 A 10/1999 Croft
(Continued)

FOREIGN PATENT DOCUMENTS

CN 101039864 A 9/2007
CN 201761453 U 3/2011
(Continued)

OTHER PUBLICATIONS

U.S. Appl. No. 14/762,305, filed Jul. 21, 2015, Tsujimura, et al.
(Continued)

*Primary Examiner* — Ilwoo Park
(74) *Attorney, Agent, or Firm* — Oblon, McClelland, Maier & Neustadt, L.L.P.

(57) ABSTRACT

An increase in the number of signal lines of a control apparatus for controlling devices of an automobile can be prevented and safety of the automobile can be secured. An in-vehicle communication system includes an input DHM that obtains device data from an input device, a BCM that generates control data for controlling an output device based on a value of the device data, and an output DHM that controls the output device according to the control data. The input DHM is composed of duplexed input control blocks, duplexed input shared memories, and an input NW control block. The BCM is composed of a BCM_NW control block, duplexed BCM shared memories for different intended uses, and duplexed arithmetic blocks. The output DHM is composed of an output NW control block, duplexed output shared memories, duplexed output control blocks, and a matching circuit.

16 Claims, 16 Drawing Sheets

(56) References Cited

U.S. PATENT DOCUMENTS

| | | | |
|---|---|---|---|
| 6,012,004 | A | 1/2000 | Sugano |
| 6,052,632 | A | 4/2000 | Iihoshi et al. |
| 6,151,306 | A | 11/2000 | Ogasawara et al. |
| 6,321,150 | B1 | 11/2001 | Nitta |
| 6,496,107 | B1 | 12/2002 | Himmelstein |
| 6,847,864 | B2 | 1/2005 | Goto et al. |
| 6,938,190 | B2 | 8/2005 | Okuda |
| 7,057,307 | B2 | 6/2006 | Yokomori |
| 7,092,806 | B2 | 8/2006 | Kumazawa et al. |
| 7,243,012 | B2 | 7/2007 | Miyake et al. |
| 7,693,638 | B2 | 4/2010 | Costin |
| 8,867,535 | B2 | 10/2014 | Takada |
| 8,966,248 | B2 | 2/2015 | Baltes |
| 9,073,553 | B2 | 7/2015 | Akiyama |
| 2003/0076221 | A1 | 4/2003 | Akiyama et al. |
| 2005/0049722 | A1 | 3/2005 | Kobayashi |
| 2005/0135133 | A1 | 6/2005 | Maehara |
| 2005/0254518 | A1 | 11/2005 | Fujimori |
| 2005/0273790 | A1 | 12/2005 | Kearney et al. |
| 2007/0027603 | A1* | 2/2007 | Katrak ............... G06F 11/1608 701/70 |
| 2007/0203618 | A1 | 8/2007 | McBride |
| 2009/0240383 | A1 | 9/2009 | Hung |
| 2010/0257139 | A1* | 10/2010 | Katrak ............... G06F 11/1637 707/640 |
| 2010/0332983 | A1 | 12/2010 | Evans |
| 2011/0029704 | A1 | 2/2011 | Itou et al. |
| 2011/0066814 | A1 | 3/2011 | Narisawa et al. |
| 2011/0128855 | A1 | 6/2011 | Ando et al. |
| 2011/0245934 | A1 | 10/2011 | Yasuda |
| 2011/0320079 | A1 | 12/2011 | Yasuda |
| 2012/0105067 | A1 | 5/2012 | Makarewicz |
| 2013/0282946 | A1 | 10/2013 | Ricci |
| 2014/0108896 | A1* | 4/2014 | Jung ............... B60W 50/0205 714/819 |

FOREIGN PATENT DOCUMENTS

| | | |
|---|---|---|
| EP | 1852382 B1 | 12/2015 |
| JP | 60 253359 | 12/1985 |
| JP | 2 1649 | 1/1990 |
| JP | 5-235962 A | 9/1993 |
| JP | 6-30003 A | 2/1994 |
| JP | 6 274361 | 9/1994 |
| JP | 07-123078 A | 5/1995 |
| JP | 9 289522 | 11/1997 |
| JP | 10-3394 A | 1/1998 |
| JP | 10 243004 | 9/1998 |
| JP | 10-257078 A | 9/1998 |
| JP | 11 261561 | 9/1999 |
| JP | 2000-158685 A | 6/2000 |
| JP | 2002-158668 A | 5/2002 |
| JP | 2003-191804 A | 7/2003 |
| JP | 2004-017676 A | 1/2004 |
| JP | 2004-034828 A | 2/2004 |
| JP | 2004-268624 A | 9/2004 |
| JP | 2004-274931 A | 9/2004 |
| JP | 2006-135375 A | 5/2006 |
| JP | 2006 176000 | 7/2006 |
| JP | 2007-28377 A | 2/2007 |
| JP | 2007 34910 | 2/2007 |
| JP | 2007-272709 A | 10/2007 |
| JP | 2009-17154 A | 1/2009 |
| JP | 2010-274783 A | 12/2010 |
| JP | 2011-244142 A | 12/2011 |
| JP | 2012 22429 | 2/2012 |
| JP | 2012-194724 A | 10/2012 |
| JP | 2012-226466 A | 11/2012 |
| WO | 2010 026836 | 3/2010 |

OTHER PUBLICATIONS

International Search Report dated Oct. 9, 2012 in PCT/JP12/071381 Filed Aug. 24, 2012.
U.S. Office Action dated Apr. 3, 2017, issued in U.S. Appl. No. 14/762,305.
U.S. Office Action dated Sep. 21. 2017. issued in U.S. Appl. No. 14/762,305.
Japanese Office Action dated Jul. 9, 2013 in Japanese Application 2013-524674 (with partial English language translation).
International Search Report dated Mar. 26, 2013 in PCT/JP2013/055655 filed Mar. 1, 2013.
International Search Report dated Jun. 12, 2012 in PCT/JP2012/060695.
Chinese Office Action dated Oct. 25, 2017 in Chinese Application No. 201380073851.2 (with English Machine Translation), 13 pages.

* cited by examiner

IN-VEHICLE COMMUNICATION SYSTEM AND IN-VEHICLE COMMUNICATION METHOD

TECHNICAL FIELD

The present invention relates, for example, to an in-vehicle communication system and an in-vehicle communication method for controlling devices of an automobile.

BACKGROUND ART

An in-vehicle system to be installed in an automobile includes an ECU (Electro Control Unit) called a BCM (Body Control Module). An I/O device (I/O: Input/Output) is connected to the BCM with a dedicated signal line, and the BCM controls the I/O device.

For in-vehicle systems as described above, there is a problem, which is that the number of signal lines connected to the BCM increases with an increase of I/O devices to be controlled.

To solve this problem, Patent Literature 1 discloses a method in which signal lines of a plurality of I/O devices are accommodated in multiplex transmission units placed at various parts of a vehicle, and these multiplex transmission units are interconnected with multiplex transmission channels.

On the other hand, in-vehicle systems require safety for preventing a serious accident even if a system failure occurs, and ISO 26262 has been standardized internationally as a safety-related standard.

CITATION LIST

Patent Literature

Patent Literature 1: JP 02-001649 A

SUMMARY OF INVENTION

Technical Problem

It is an object of the present invention, for example, to prevent an increase in the number of signal lines of a control apparatus for controlling devices of an automobile and secure safety of the automobile.

Solution to Problem

An in-vehicle communication system according to the present invention includes an input transmission apparatus, a control apparatus, and an output transmission apparatus.

The input transmission apparatus includes a first device data input part that obtains, as first device data, data outputted from a device being installed in the vehicle as an input source device;

a second device data input part that obtains, as second device data, the data outputted from the input source device; and an input transmission part that generates first input transmission data, including the first device data obtained by the first device data input part and first input safety communication data for determining a communication result, generates second input transmission data, including the second device data obtained by the second device data input part and second input safety communication data for determining a communication result, and transmits the first input transmission data and the second input transmission data to the control apparatus.

The control apparatus includes a control receiving part that receives the first input transmission data and the second input transmission data which are transmitted from the input transmission apparatus;

a first control determination part that determines whether communication of the first device data included in the first input transmission data has been performed properly, based on the first input safety communication data included in the first input transmission data received by the control receiving part;

a first control arithmetic part that, upon being determined that the communication of the first device data has been performed properly, generates first control data to specify control based on the first device data, and upon being determined that the communication of the first device data has not been performed properly, generates first control data to specify fail-safe control which is predetermined;

a second control determination part that determines whether communication of the second device data included in the second input transmission data has been performed properly, based on the second input safety communication data included in the second input transmission data received by the control receiving part;

a second control arithmetic part that, upon being determined that the communication of the second device data has been performed properly, generates second control data to specify control based on the second device data, and upon being determined that the communication of the second device data has not been performed properly, generates second control data to specify the fail-safe control; and a control transmission part that generates first control transmission data including the first control data generated by the first control arithmetic part, generates second control transmission data including the second control data generated by the second control arithmetic part, and transmits the first control transmission data and the second control transmission data to the output transmission apparatus The output transmission apparatus includes an output receiving part that receives the first control transmission data and the second control transmission data which are transmitted from the control apparatus; and a device control data output part that outputs device control data for controlling a device to be controlled which is installed in the vehicle, based on the first control data included in the first control transmission data received by the output receiving part and the second control data included in the second control transmission data received by the output receiving part.

Advantageous Effects of Invention

According to the present invention, for example, an increase in the number of signal lines for controlling devices of an automobile can be prevented and safety of the automobile can be secured.

DESCRIPTION OF EMBODIMENTS

First Embodiment

An embodiment will be described according to which an increase in the number of signal lines of a control apparatus for controlling devices of an automobile is prevented and safety of the automobile is secured.

Figure 1:
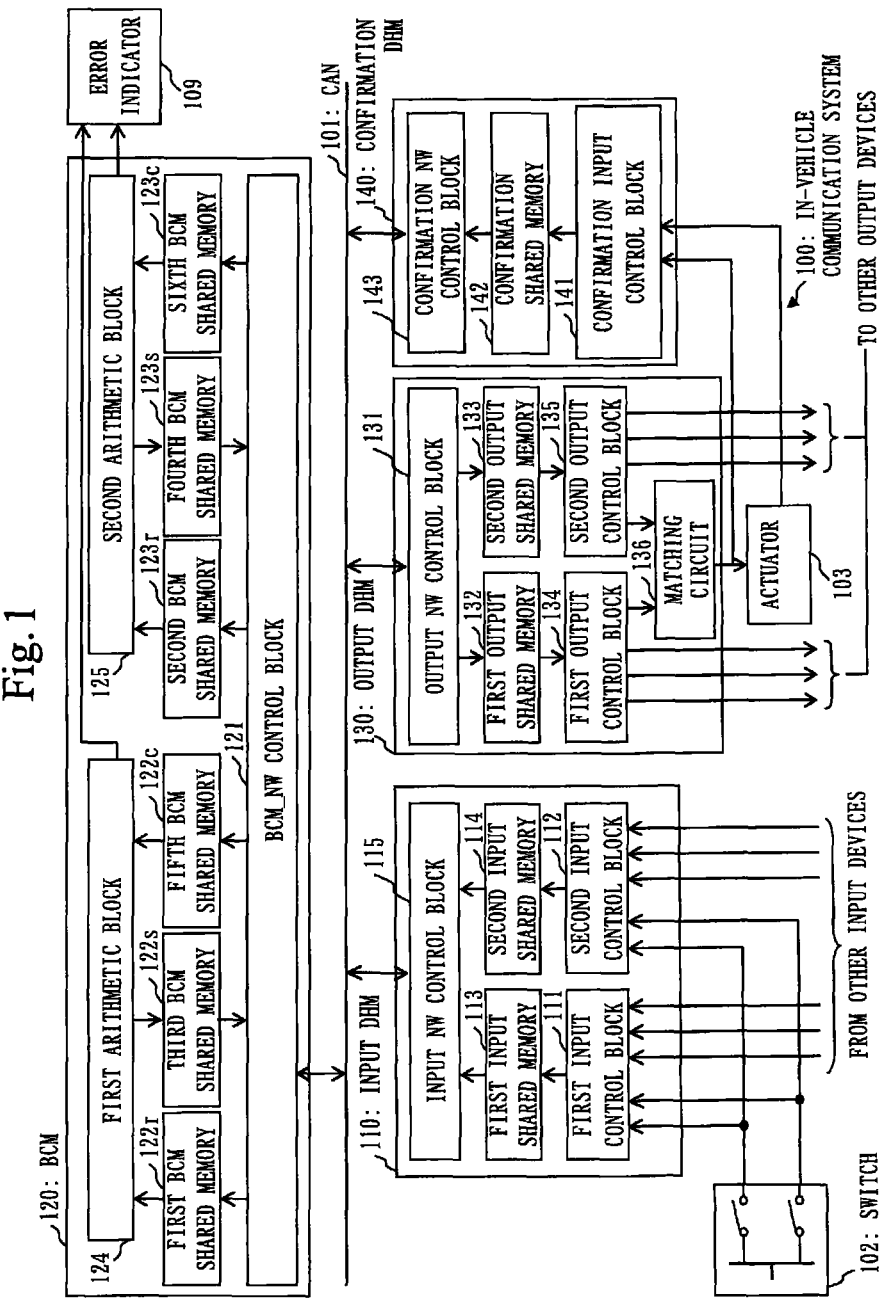
FIG. 1 is a configuration diagram of an in-vehicle communication system 100 according to a first embodiment.

FIG. 1 is a configuration diagram of an in-vehicle communication system 100 according to a first embodiment.

With reference to FIG. 1, the configuration of the in-vehicle communication system 100 according to the first embodiment will be described.

The in-vehicle communication system 100 (an example of an in-vehicle communication system) is a system to be installed in an automobile (an example of a vehicle).

The in-vehicle communication system 100 includes an input DHM 110 (an example of an input transmission apparatus), a BCM 120 (an example of a control apparatus), an output DHM 130 (an example of an output transmission apparatus), and a confirmation DHM 140 (an example of a feedback transmission apparatus).

DHM stands for "Device Hub Module", and BCM stands for "Body Control Module".

The input DHM 110, the BCM 120, the output DHM 130, and the confirmation DHM 140 communicate through a network called a CAN 101.

CAN stands for "Controller Area Network".

Note that the CAN may be replaced with a network based on another standard.

One or more devices installed in the automobile are connected to the input DHM 110 and the output DHM 130 through signal lines.

A switch 102, a button, and a sensor are examples of a device connected to the input DHM 110. An actuator 103, a light, and a motor are examples of a device connected to the output DHM 130.

Each device that is connected to the input DHM 110 will hereinafter be referred to as an "input device". Each device that is connected to the output DHM 130 will hereinafter be referred to as an "output device".

The input DHM 110 is a transmission apparatus that transmits device data outputted from an input device.

The input DHM 110 is also a multiplex transmission apparatus that multiplexes and transmits device data outputted from an input device intended for multiplex transmission.

In FIG. 1, the switch 102 is an example of the input device intended for multiplex transmission.

The input DHM 110 includes an input control block, an input shared memory, and an input NW control block 115 (an example of an input transmission part). Each of the input control block and the input shared memory is implemented as a duplexed pair.

The duplexed pair of the input control block will hereinafter be referred to as a "first input control block 111 (an example of a first device data input part)" and a "second input control block 112 (an example of a second device data input part)". The duplexed pair of the input shared memory will hereinafter be referred to as a "first input shared memory 113 (an example of a first input memory)" and a "second input shared memory 114 (an example of a second input memory)".

Each input device intended for multiplex transmission (for example, the switch 102) is connected to each of the first input control block 111 and the second input control block 112. Other input devices are connected to either of the first input control block 111 and the second input control block 112.

The function and operation of each component of the input DHM 110 will be described later.

The BCM 120 is a control apparatus that transmits control data for controlling an output device to be controlled based on the device data transmitted from the input DHM 110.

The BCM 120 is also a control apparatus that multiplexes and transmits control data based on each device data which is multiplexed and transmitted by the input DHM 110.

The BCM 120 includes a BCM_NW control block 121 (an example of a control receiving part and a control transmission part), a receiving shared memory, a transmission shared memory, a confirmation shared memory, and an arithmetic block. Each of the receiving shared memory, the transmission shared memory, the confirmation shared memory, and the arithmetic block is implemented as a duplexed pair.

The duplexed pair of the receiving shared memory will hereinafter be referred to as a "first BCM shared memory 122r (an example of a first receiving memory)" and a "second BCM shared memory 123r (an example of a second receiving memory)". The duplexed pair of the transmission shared memory will be referred to as a "third BCM shared memory 122s (an example of a first transmission memory)" and a "fourth BCM shared memory 123s (an example of a second transmission memory)". The duplexed pair of the confirmation shared memory will be referred to as a "fifth BCM shared memory 122c (an example of a first confirmation memory)" and a "sixth BCM shared memory 123c (an example of a second confirmation memory)". The duplexed pair of the arithmetic block will be referred to as a "first arithmetic block 124 (an example of a first control determination part, a first control arithmetic part, and a first confirmation determination part)" and a "second arithmetic block 125 (an example of a second control determination part, a second control arithmetic part, and a second confirmation determination part)".

The function and operation of each component of the BCM 120 will be described later.

The output DHM 130 is a transmission apparatus that receives the control data transmitted from the BCM 120 and controls the output device to be controlled based on the received control data.

The output DHM 130 is also a multiplex transmission apparatus that receives each control data which is multiplexed and transmitted by the BCM 120, and controls the output device to be controlled based on each received control data.

In FIG. 1, the actuator 103 is an example of the output device to be controlled based on each control data which is multiplexed and transmitted.

The output DHM 130 includes an output NW control block 131 (an example of an output receiving part), an output shared memory, an output control block, and a matching circuit 136 (an example of a matching output part). Each of the output shared memory and the output control block is implemented as a duplexed pair.

The duplexed pair of the output shared memory will hereinafter be referred to as a "first output shared memory 132 (an example of a first output memory)" and a "second output shared memory 133 (an example of a second output memory)". The duplexed pair of the output control block will be referred to as a "first output control block 134 (an example of a first output determination part and a first output arithmetic part)" and a "second output control block 135 (an example of a second output determination part and a second output arithmetic part)".

The function and operation of each component of the output DHM 130 will be described later.

The confirmation DHM 140 is a transmission apparatus that obtains the control data outputted from the output DHM 130 to the output device to be controlled and status data indicating an operating status of the output device to be controlled, and transmits the obtained control data and status data to the BCM 120.

The confirmation DHM 140 includes a confirmation input control block 141 (an example of a feedback input part), a confirmation shared memory 142 (an example of a feedback memory), and a confirmation NW control block 143 (an example of a feedback transmission part).

The function and operation of each component of the confirmation DHM 140 will be described later.

An error indicator 109 is an apparatus that notifies a driver of a communication error of the input DHM 110, the BCM 120, or the output DHM 130, or a control error of an output device.

An instrument panel including an instrument cluster or a car navigation system is an example of the error indicator 109.

The components of the in-vehicle communication system 100 are separated from one another logically (software-wise) or physically (hardware-wise).

In the embodiments, arrows included in the configuration diagrams and flowcharts mainly indicate inputs and outputs of data or signals.

What is described as a "block" of the input DHM 110, the BCM 120, or the output DHM 130 may be a "circuit", "apparatus", or "equipment", and may also be a "part", "process", or "step".

That is, the input DHM 110, the BCM 120, and the output DHM 130 may be implemented with hardware, software (programs), firmware, or a combination of these.

FIG. 2 through FIG. 7 are flowcharts illustrating an in-vehicle communication method of the in-vehicle communication system 100 according to the first embodiment.

With reference to FIG. 2 through FIG. 7, the in-vehicle communication method of the in-vehicle communication system 100 according to the first embodiment will be described.

In the description of the in-vehicle communication method of the in-vehicle communication system 100 hereinafter, an "input device" means an input device intended for multiplex communication, and an "output device" means an output device to be controlled based on device data outputted from the input device.

Figure 2:
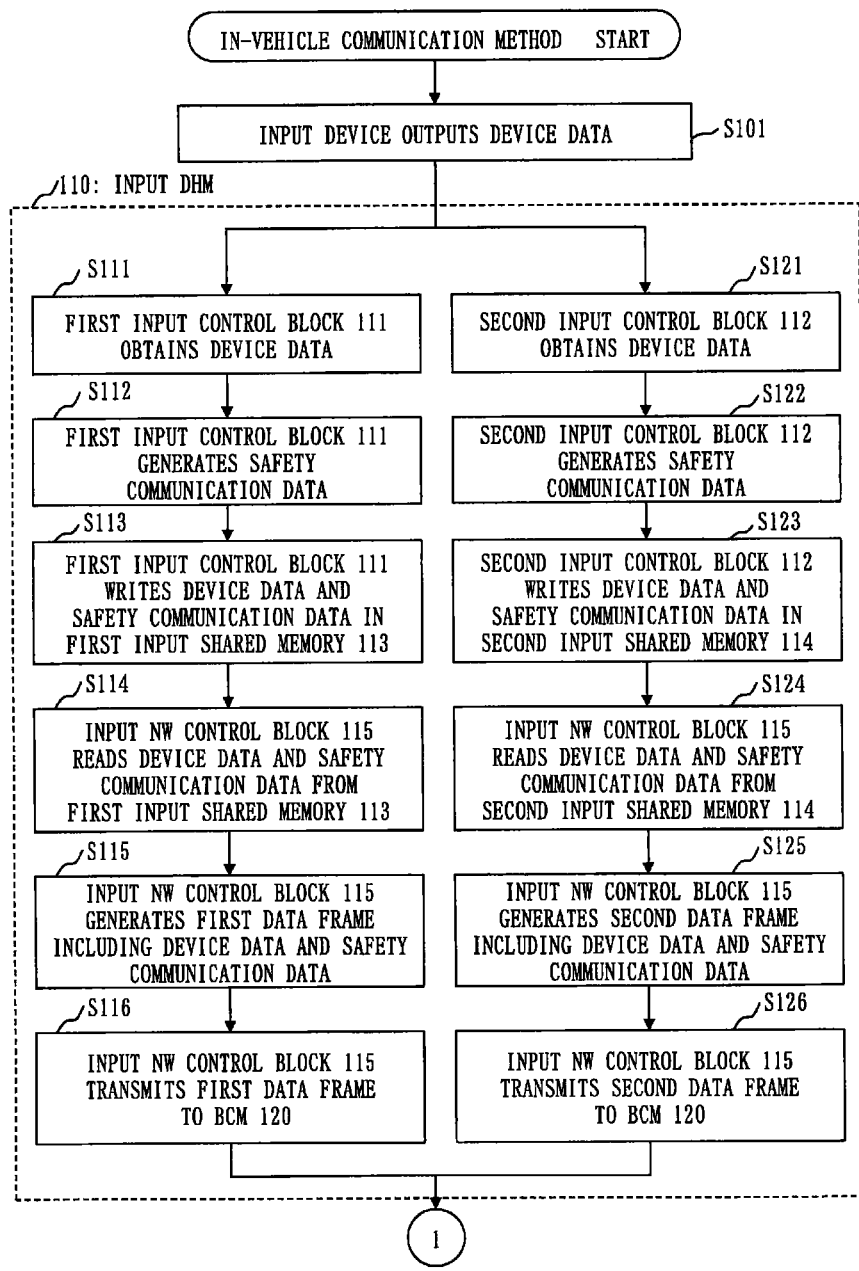
FIG. 2 is a flowchart illustrating an in-vehicle communication method of the in-vehicle communication system 100 according to the first embodiment.

The in-vehicle communication method of the in-vehicle communication system 100 will be described starting from FIG. 2.

In S101, the input device outputs device data to the input DHM 110.

For example, a push switch having two contacts (the switch 102 in FIG. 1) functions as the input device. While the switch 102 is being pushed, the switch 102 outputs a Low signal value as the device data. While the switch 102 is not being pushed, the switch 102 outputs a High signal value as the device data.

The device data may be pulled up by the input DHM 110. That is, if a signal line connecting the switch 102 and the input DHM 110 is disconnected, the device data indicating a High signal value is inputted to the input DHM 110 by being pulled up.

After S101, processing proceeds to S111 and S121.

S111 through S116 and S121 through S126 below are executed by the components of the input DHM 110.

In S111, the first input control block ill accesses an input port to which the input device is connected at regular intervals and obtains the device data outputted in S101.

The regular intervals are intervals such that the real-time property of the system as a whole will not be lost. If an operation by the driver is involved, a delay of approximately 100 milliseconds is allowed from when the driver operates the input device to when the output device is controlled. Therefore, intervals of approximately 10 milliseconds are sufficient as the regular intervals. The same applies to the regular intervals to be described hereinafter.

After S111, processing proceeds to S112.

In S112, based on the device data obtained in S111, the first input control block 111 generates safety communication data for confirming a communication result.

The safety communication data is data for checking whether a communication failure is present. A sequence number indicating a serial number of communication data or an error detection code such as a CRC code (CRC: Cyclic Redundancy Check) is an example of the safety communication data.

A function to check whether a communication failure is present based on the safety communication data will hereinafter be referred to as a "safety communication function". "End-to-End Communication Protection" of AUTOSAR is an example of a standard related to the safety communication function. The same applies to the safety communication data and safety communication function to be described hereinafter.

After S112, processing proceeds to S113.

In S113, the first input control block 111 writes the device data obtained in

S111 and the safety communication data generated in S112 in the first input shared memory 113. Writing "data" may be read as "storing" data (the same applies hereinafter).

After S113, processing proceeds to S114.

In S114, the input NW control block 115 accesses the first input shared memory 113 at the regular intervals, and reads the device data and the safety communication data from the first input shared memory 113. "Reading" data may be read as "acquiring" data (the same applies hereinafter).

In S115, the input NW control block 115 generates a frame for the CAN 101 including the device data and the safety communication data read in S114. A frame is data which is generated in a predetermined format so as to be communicated through the network (the same applies hereinafter). The frame generated in S115 will hereinafter be referred to as a "first data frame".

In S116, the input NW control block 115 transmits the first data frame generated in S115 to the BCM 120 through the CAN 101.

Figure 3:
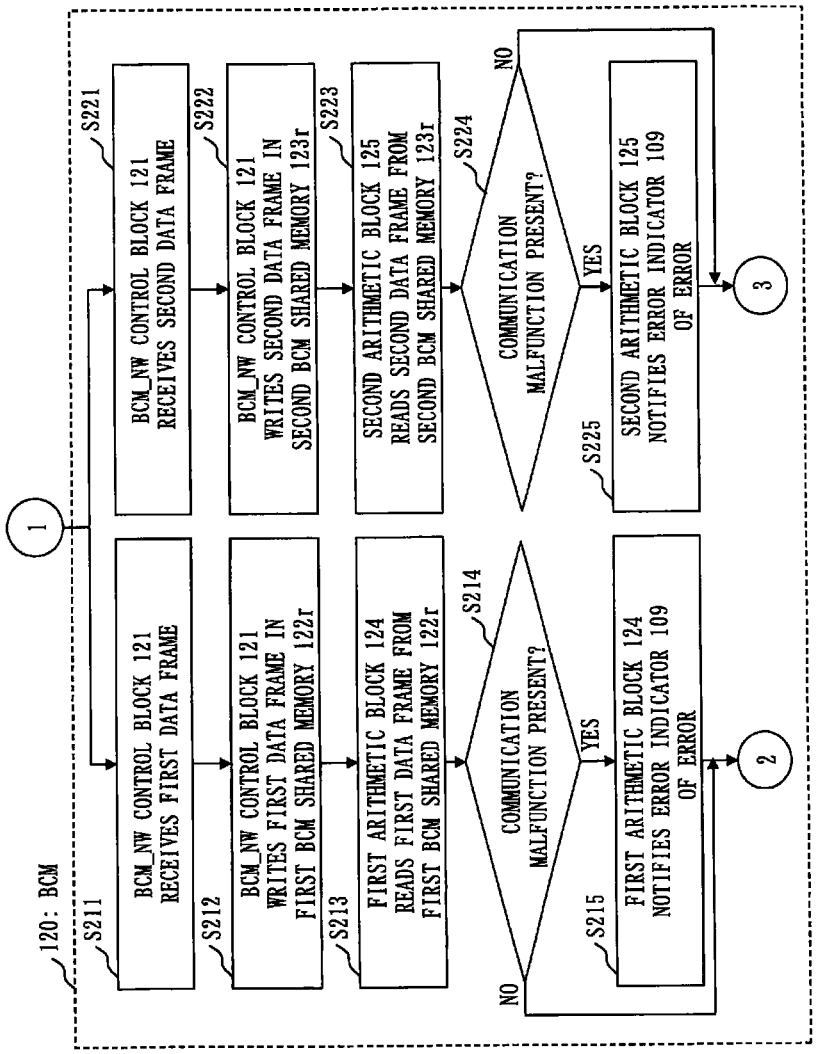
FIG. 3 is a flowchart illustrating the in-vehicle communication method of the in-vehicle communication system 100 according to the first embodiment.

After S116, processing proceeds to S211 (see FIG. 3).

In S121 through S126, the second input control block 112 and the input NW control block 115 operate in the same manner as in S111 through S116 using the second input shared memory 114.

That is, the second input control block 112 obtains device data (S121), generates safety communication data (S122), and writes the device data and the safety communication data in the second input shared memory 114 (S123).

The input NW control block 115 reads the device data and the safety communication data from the second input shared memory 114 (S124), generates a second data frame including the device data and the safety communication data (S125), and transmits the second data frame to the BCM 120 (S126). After S126, processing proceeds to S221.

With reference to FIG. 3, the processes in S211 and onward and in S221 and onward will be described.

In FIG. 3, S211 through S215 and S221 through S225 are executed by the components of the BCM 120.

In S211, the BCM_NW control block 121 receives the first data frame transmitted from the input DHM 110.

After S211, processing proceeds to S212.

In S212, the BCM_NW control block 121 writes the first data frame received in S211 in the first BCM shared memory 122r.

For example, the first data frame and the second data frame each include an identifier (IP address, identification number, etc.) to identify the first data frame and the second data frame, respectively. Based on this identifier, the BCM_NW control block 121 distinguishes the first data frame and the second data frame.

After S212, processing proceeds to S213.

In S213, the first arithmetic block 124 accesses the first BCM shared memory 122r at the regular intervals, and reads the first data frame from the first BCM shared memory 122r.

After S213, processing proceeds to S214.

In S214, using the safety communication function, the first arithmetic block 124 determines whether a communication malfunction has occurred in the communication of the first data frame.

For example, the first arithmetic block 124 checks the sequence number or CRC code indicated by the safety communication data included in the first data frame. If the safety communication data is not a correct value, the first arithmetic block 124 determines that a communication malfunction has occurred. The same applies to the safety communication function to be described hereinafter.

If it is determined that a communication malfunction has occurred (YES), processing proceeds to S215.

Figure 4:
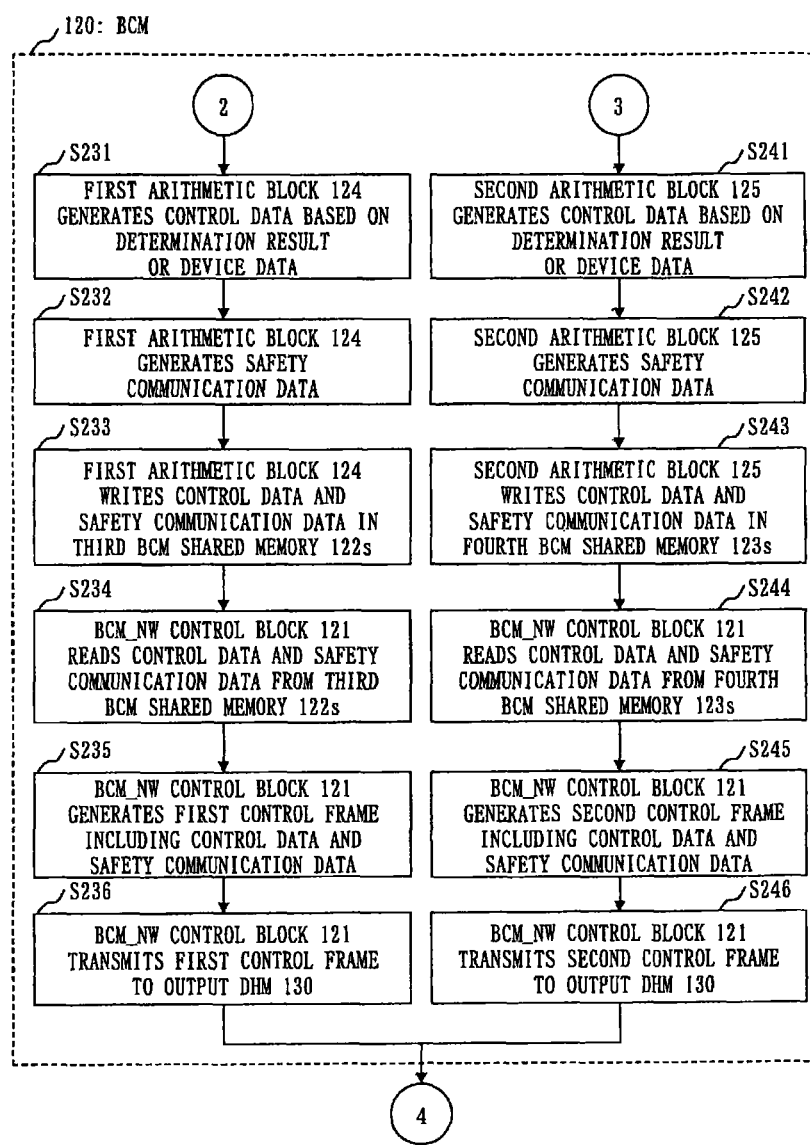
FIG. 4 is a flowchart illustrating the in-vehicle communication method of the in-vehicle communication system 100 according to the first embodiment.

If it is determined that no communication malfunction has occurred (NO), processing proceeds to S231 (See FIG. 4).

In S215, the first arithmetic block 124 inputs to the error indicator 109 error notification data for notifying that a vehicle communication error has occurred.

For example, upon input of the error notification data, the instrument panel or the car navigation system that functions as the error indicator 109 operates as described below.

The instrument panel flashes an error indicator lamp.

The car navigation system displays an error message on a display, or outputs a voice error message.

After S215, processing proceeds to S231 (see FIG. 4).

In S221 through S225, the BCM_NW control block 121 and the second arithmetic block 125 operate in the same manner as in S211 through S215 using the second BCM shared memory 123r.

That is, the BCM_NW control block 121 receives the second data frame (S221), and writes the second data frame in the second BCM shared memory 123r (S222).

The second arithmetic block 125 reads the second data frame from the second BCM shared memory 123r (S223), and determines whether a communication malfunction has occurred (S224). If it is determined that a communication malfunction has occurred, the second arithmetic block 125 notifies the error indicator 109 of an error (S225).

If it is determined in S224 that no communication malfunction has occurred or after S225, processing proceeds to S241.

With reference to FIG. 4, the processes in S231 and onward and in S241 and onward will be described.

In FIG. 4, S231 through S236 and S241 through S246 are executed by the components of the BCM 120.

In S231, if it is determined in S214 that a communication malfunction has occurred, the first arithmetic block 124 generates control data to specify fail-safe control.

The fail-safe control is control to perform safe operation when a failure occurs. The fail-safe control is predetermined for each output device. For example, the first arithmetic block 124 generates control data indicating a Low signal value so as to stop the output device. The same applies to the fail-safe control to be described hereinafter.

If it is determined in S214 that no communication malfunction has occurred, the first arithmetic block 124 generates control data to specify control according to the value of the device data (hereinafter referred to as "regular control"), based on the device data included in the first data frame.

For example, the first arithmetic block 124 uses the value of the device data as the control data to make the actuator 103 (an example of the output device) operate according to an operation on the switch 102 (an example of the input device). Alternatively, for example, the first arithmetic block 124 generates, as the control data, data for turning on or off a motor or data for PWM (Pulse Width Modulation) for adjusting the brightness of lighting in the vehicle. The same applies to the control according to the value of the device data to be described hereinafter.

After S231, processing proceeds to S232.

In S232, the first arithmetic block 124 generates safety communication data based on the control data generated in S231.

In S233, the first arithmetic block 124 writes the control data generated in S231 and the safety communication data generated in S232 in the third BCM shared memory 122s.

After S233, processing proceeds to S234.

In S234, the BCM_NW control block 121 reads the control data and the safety communication data from the third BCM shared memory 122s.

In S235, the BCM_NW control block 121 generates a frame for the CAN 101 including the control data and the safety communication data read in S234. The frame generated in S235 will hereinafter be referred to as a "first control frame".

In S236, the BCM_NW control block 121 transmits the first control frame generated in S235 to the output DHM 130 through the CAN 101.

Figure 5:
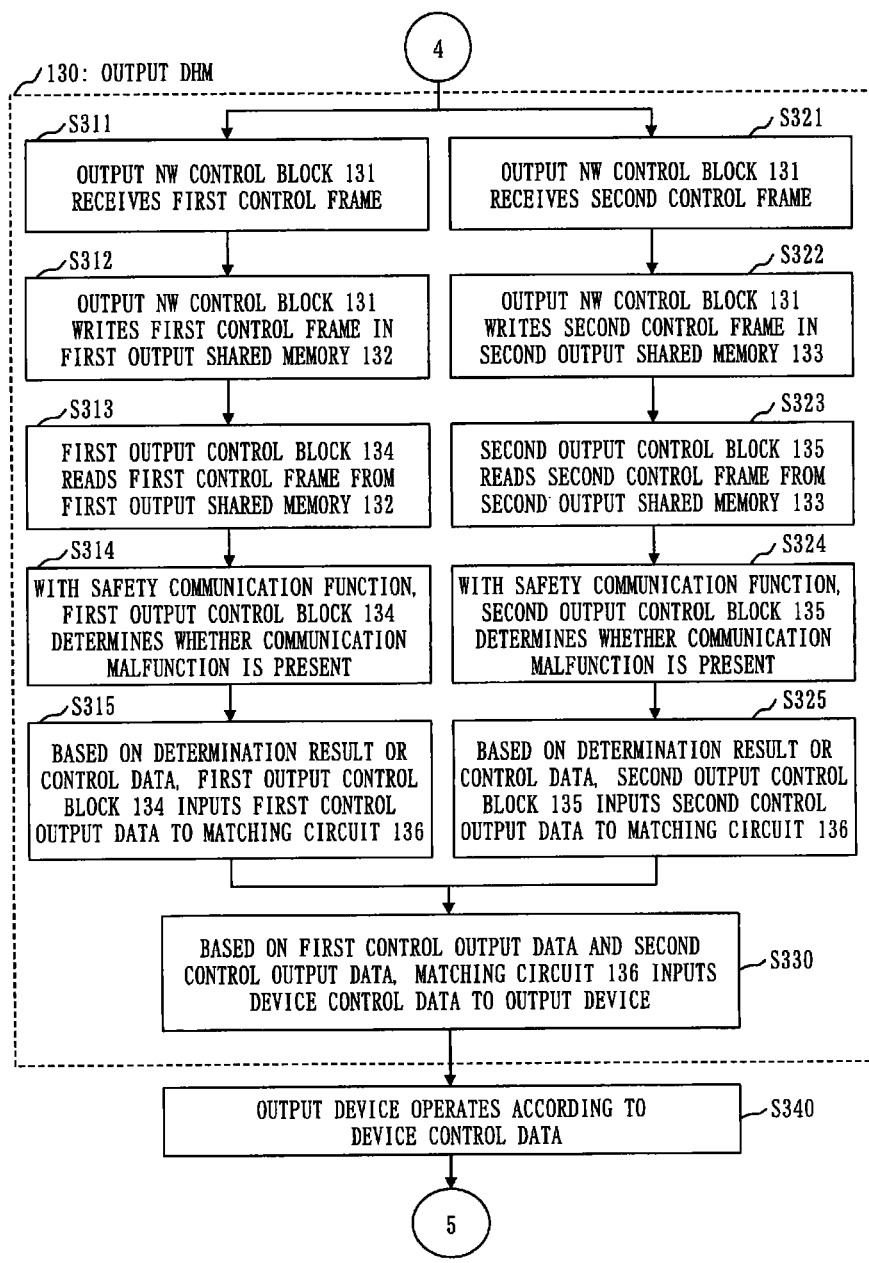
FIG. 5 is a flowchart illustrating the in-vehicle communication method of the in-vehicle communication system 100 according to the first embodiment.

After S236, processing proceeds to S311 (see FIG. 5).

In S241 through S246, the second arithmetic block 125 and the BCM_NW control block 121 operate in the same manner as in S231 through S236 using the fourth BCM shared memory 123s.

That is, the second arithmetic block 125 generates control data based on a determination result in S224 or the device data included in the second data frame (S241), generates safety communication data (S242), and writes the control data and the safety communication data in the fourth BCM shared memory 123s (S243).

The BCM_NW control block 121 reads the control data and the safety communication data from the fourth BCM shared memory 123s (S244), generates a second control frame including the control data and the safety communication data (S245), and transmits the second control frame to the BCM 120 (S246). After S246, processing proceeds to S321 (see FIG. 5).

With reference to FIG. 5, the processes in S311 and onward and in S321 and onward will be described.

In FIG. 5, S311 through S315, S321 through S325, and S330 are executed by the components of the output DHM 130.

In S311, the output NW control block 131 receives the first control frame transmitted from the BCM 120.

In S312, the output NW control block 131 writes the first control frame received in S311 in the first output shared memory 132.

For example, the first control frame and the second control frame each include an identifier to identify the first control frame and the second control frame, respectively. Based on this identifier, the output NW control block 131 distinguishes the first control frame and the second control frame.

After S312, processing proceeds to S313.

In S313, the first output control block 134 accesses the first output shared memory 132 at the regular intervals, and reads the first control frame from the first output shared memory 132.

After S313, processing proceeds to S314.

In S314, using the safety communication function, the first output control block 134 determines whether a communication malfunction has occurred in the communication of the first control frame.

After S314, processing proceeds to S315.

In S315, if it is determined in S314 that a communication malfunction has occurred, the first output control block 134 generates control data to specify the fail-safe control, and inputs the generated control data to the matching circuit 136.

If it is determined in S314 that no communication malfunction has occurred, the first output control block 134 inputs the control data included in the first control frame to the matching circuit 136.

The control data that is inputted to the matching circuit 136 in S315 will hereinafter be referred to as "first control output data".

After S315, processing proceeds to S330.

In S321 through S325, the output NW control block 131 and the second output control block 135 operate in the same manner as in S311 through S315 using the second output shared memory 133.

That is, the output NW control block 131 receives the second control frame (S321), and writes the second control frame in the second output shared memory 133 (S322).

The second output control block 135 reads the second control frame from the second output shared memory 133 (S323), determines whether a communication malfunction has occurred (S324), and inputs second control output data to the matching circuit 136 based on this determination result or the control data included in the second control frame (S325). After S325, processing proceeds to S330.

In S330, the matching circuit 136 inputs device control data for controlling the output device to the output device, based on the first control output data inputted in S315 and the second control output data inputted in S325.

For example, the matching circuit 136 inputs the device control data as described below to the output device.

If both of the first control output data and the second control output data indicate the same value, the matching circuit 136 inputs this value to the output device as the device control data.

If the first control output data and the second control output data indicate mutually different values, the matching circuit 136 inputs the device control data indicating the fail-safe control to the output device.

With this arrangement, if a malfunction occurs in at least one of duplexed communication channels, the matching circuit 136 can make the output device operate in a fail-safe manner.

For example, the matching circuit 136 may be composed of a simple NOR circuit.

After S330, processing proceeds to S340.

In S340, the output device operates in accordance with the device control data inputted in S330.

For example, if the device control data indicates a value to instruct execution of operation, the actuator 103 that functions as the output device executes the operation. That is, the actuator 103 causes a predetermined device such as a motor to operate.

If the device control data indicates a value to instruct stopping of operation, the actuator 103 that functions as the output device stops the operation. That is, the actuator 103 causes a predetermined device such as a motor to stop.

Figure 6:
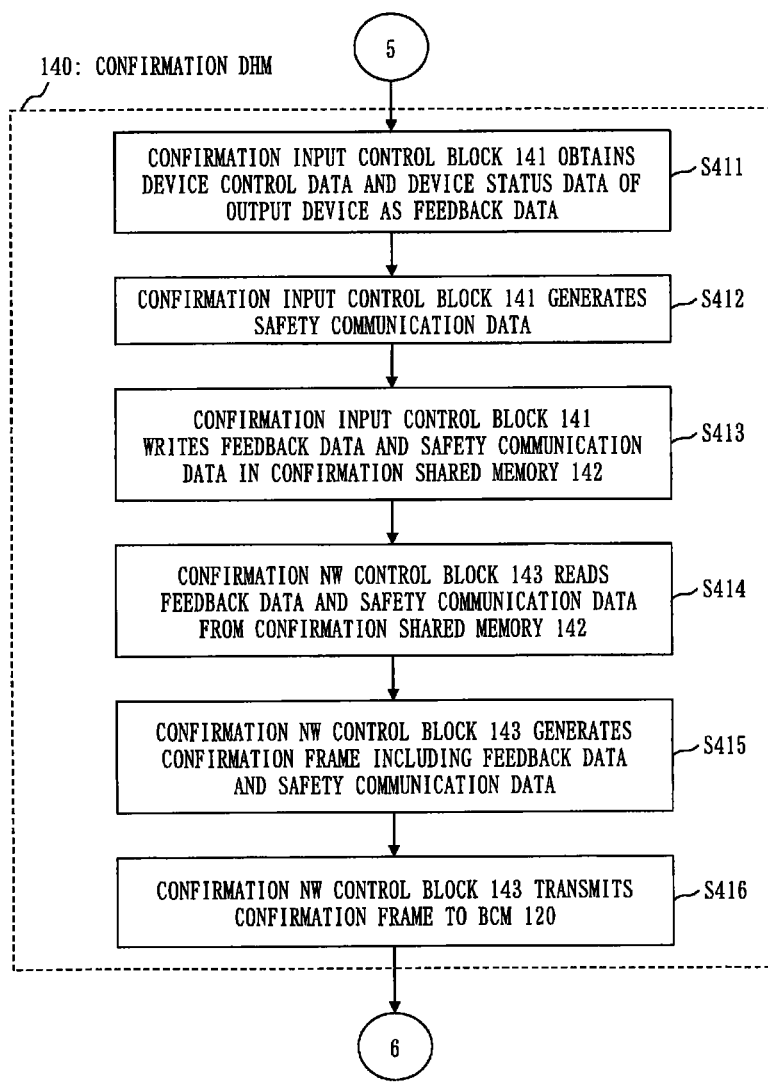
FIG. 6 is a flowchart illustrating the in-vehicle communication method of the in-vehicle communication system 100 according to the first embodiment.

After S340, processing proceeds to S411 (see FIG. 6).

With reference to FIG. 6, the processes in S411 and onward will be described.

In FIG. 6, S411 through S416 are executed by the components of the confirmation DHM 140.

In S411, the confirmation input control block 141 obtains the device control data outputted from the matching circuit 136 and inputted to the output device in S330.

The confirmation input control block 141 also requests device status data indicating an operating status of the actuator 103, from the actuator 103 which operates according to the device data in S340, and obtains the device status data from the actuator 103.

Note that the confirmation input control block 141 may obtain either one of the device control data and the device status data.

The device control data and the device status data obtained in S411 will hereinafter be referred to as "feedback data".

After S411, processing proceeds to S412.

In S412, the confirmation input control block 141 generates safety communication data based on the feedback data obtained in S411.

In S413, the confirmation input control block 141 writes the feedback data obtained in S411 and the safety communication data generated in S412 in the confirmation shared memory 142.

After S413, processing proceeds to S414.

In S414, the confirmation NW control block 143 accesses the confirmation shared memory 142 at the regular intervals, and reads the feedback data and the safety communication data from the confirmation shared memory 142.

In S415, the confirmation NW control block 143 generates a frame for the CAN 101 including the feedback data and the safety communication data read in S414. The frame generated in S415 will hereinafter be referred as a "confirmation frame".

In S416, the confirmation NW control block 143 transmits the confirmation frame generated in S415 to the BCM 120 through the CAN 101. For example, the confirmation NW control block 143 transmits the confirmation frame by multicasting to have the confirmation frame stored in the fifth BCM shared memory 122c and the sixth BCM shared memory 123c of the BCM 120. Note that the confirmation NW control block 143 may transmit a first confirmation frame to be stored in the fifth BCM shared memory 122c and a second confirmation frame to be stored in the sixth BCM shared memory 123c, by unicasting.

Figure 7:
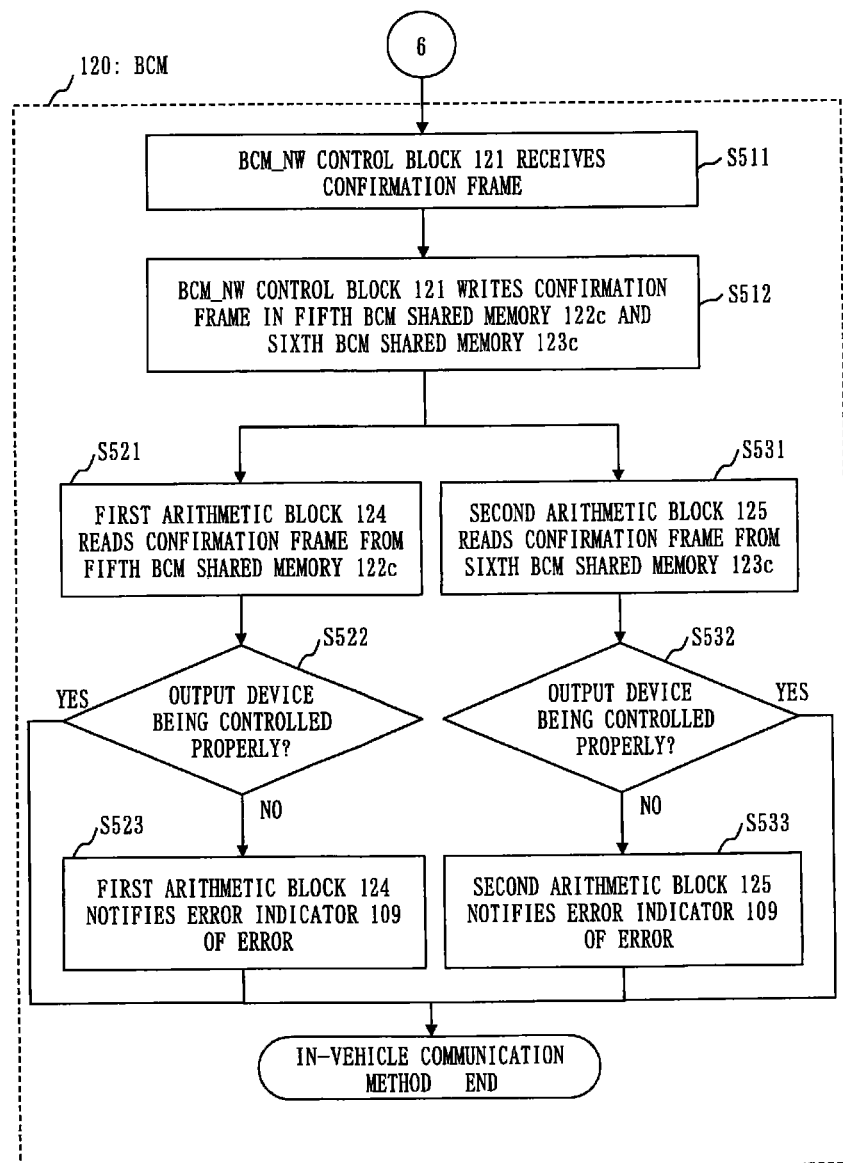
FIG. 7 is a flowchart illustrating the in-vehicle communication method of the in-vehicle communication system 100 according to the first embodiment.

After S416, processing proceeds to S511 (see FIG. 7).

With reference to FIG. 7, the processes in S511 and onward will be described.

In FIG. 7, S511 through S533 are executed by the components of the BCM 120.

In S511, the BCM_NW control block 121 receives the confirmation frame transmitted from the confirmation DHM 140.

In S512, the BCM_NW control block 121 writes the confirmation frame received in S511 in the fifth BCM shared memory 122c and the sixth BCM shared memory 123c.

After S512, processing proceeds to S521 and S531.

In S521, the first arithmetic block 124 accesses the fifth BCM shared memory 122c at the regular intervals, and reads the confirmation frame from the fifth BCM shared memory 122c.

After S521, processing proceeds to S522.

In S522, the first arithmetic block 124 compares the feedback data included in the confirmation frame read from the fifth BCM shared memory 122c in S521 and the control data written in the third BCM shared memory 122s in S233 (see FIG. 4). Then, based on this comparison result, the first arithmetic block 124 determines whether the output device is being controlled properly.

For example, if the device control data (an example of the feedback data) and the control data are the same, and operation indicated by the device status data (an example of the feedback data) and operation corresponding to the control data are the same, the first arithmetic block 124 determines that the output device is being controlled properly. In other cases, the first arithmetic block 124 determines that the output device is not being controlled properly.

If it is determined that the output device is being controlled properly (YES), the sequence of the processes of the in-vehicle communication method is completed.

If it is determined that the output device is not being controller properly (NO), processing proceeds to S523.

In S523, the first arithmetic block 124 inputs to the error indicator 109 error notification data to notify that a control error of the output device has occurred.

The operation of the error indicator 109 is the same as that in S215 (see FIG. 3). S523 completes the sequence of the processes of the in-vehicle communication method.

In S531 through S533, the second arithmetic block 125 operates in the same manner as in S521 through S523 using the sixth BCM shared memory 123c.

That is, the second arithmetic block 125 reads the confirmation frame from the sixth BCM shared memory 123c (S531), and compares the device control data included in the confirmation frame and the control data of S243 to determine whether the output device is being controlled properly (S532). If it is determined that the output device is not being controlled properly, the second arithmetic block 125 notifies the error indicator 109 of an error (S533).

The in-vehicle communication method described with reference to FIG. 2 through FIG. 7 is executed repeatedly.

According to the first embodiment, even if a single-point failure occurs due to a fault or erroneous operation, the in-vehicle communication system 100 can secure a high level of safety with the fail-safe control.

That is, the in-vehicle communication system 100 can implement the fail-safe control on the output device even if a failure occurs in any of the components, except for a failure in the matching circuit 136 or the output device that is unavoidable in principle.

The first embodiment has been described according to which each of the control blocks and memories for input, arithmetic, or output of the input DHM 110, the BCM 120, and the output DHM 130 may be implemented as a duplexed pair. However, these components may be multiplexed threefold or more. Alternatively, at lease one of the duplexed pairs of the components may be implemented as a single block or single memory without being multiplexed.

Each of the NW control blocks of the input DHM 110, the BCM 120, and the output DHM 130 may be multiplexed.

Further, each component of the confirmation DHM 140 may be multiplexed. However, the confirmation DHM 140 is a component for confirming whether the output device is being controlled properly after the output device has been controlled. Thus, it is considered that even if each component of the confirmation DHM 140 is not implemented as a duplexed pair, this has no effect on safety.

Figure 8:
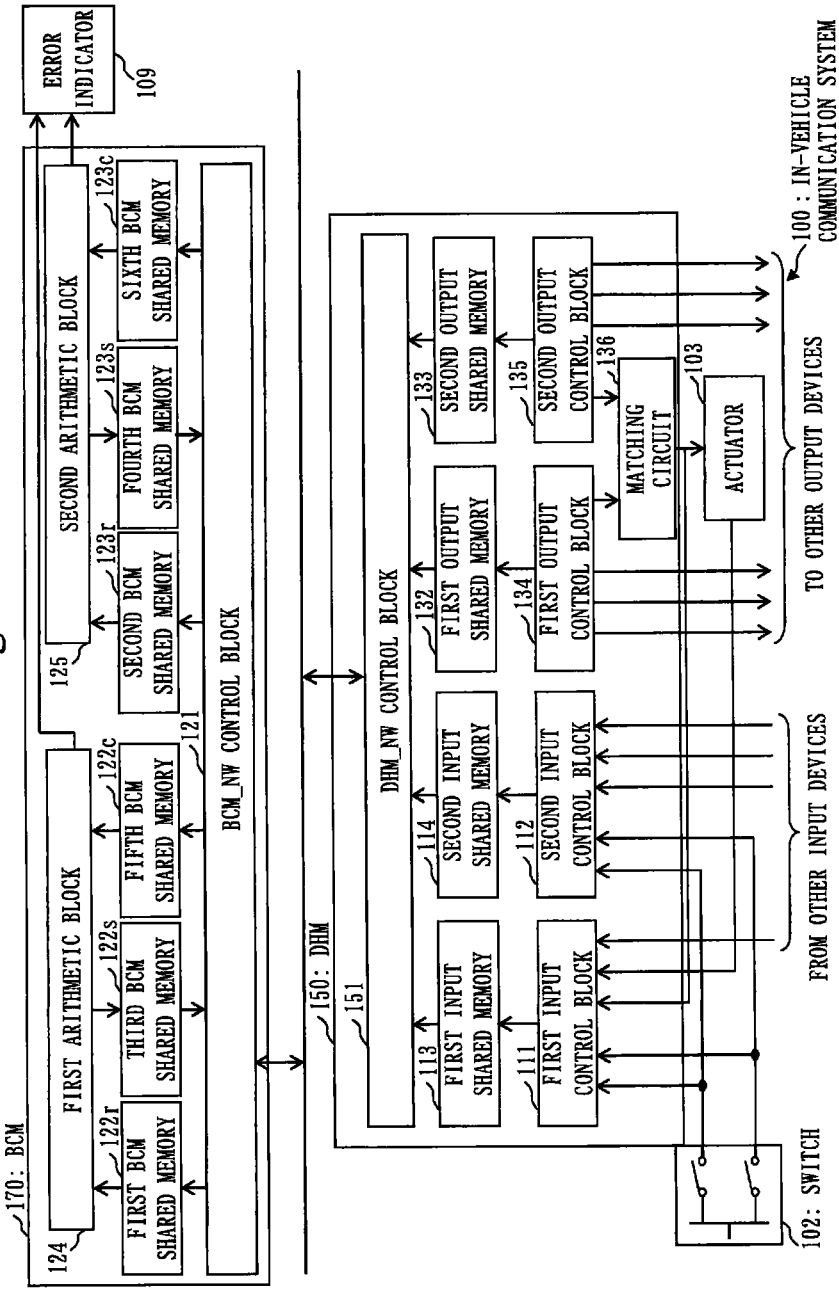
FIG. 8 is a diagram illustrating an example of a configuration of the in-vehicle communication system 100 according to the first embodiment.

FIG. 8 is a diagram illustrating an example of a configuration of the in-vehicle communication system 100 according to the first embodiment.

A DHM 150 illustrated in FIG. 8 is an apparatus in which the input DHM 110, the output DHM 130, and the confirmation DHM 140 are integrated. Note that the first input control block 111 and the first input shared memory 113 also have the function of the confirmation input control block 141 and the confirmation shared memory 142, respectively.

In the in-vehicle communication system 100, the input DHM 110, the output DHM 130, and the confirmation DHM 140 may be implemented as the single DHM 150, as illustrated in FIG. 8.

Alternatively, any combination of the input DHM 110, the BCM 120, the output DHM 130, and the confirmation DHM 140 may be implemented as a single apparatus.

In the first embodiment, an in-vehicle communication system (in-vehicle communication system 100) as described below, for example, has been described. The reference numerals and names of the corresponding components described in the first embodiment will be indicated in parentheses.

The in-vehicle communication system 100 includes an input transmission apparatus (input DHM 110), a control apparatus (BCM 120), and an output transmission apparatus (output DHM 130).

The input transmission apparatus includes a first device data input part (first input control block 111), a second device data input part (second input control block 112), and an input transmission part (input NW control block 115).

The first device data input part obtains, as first device data, data outputted from a device (input device) being installed in the vehicle as an input source device.

The second device data input part obtains, as second device data, the data outputted from the input source device.

The input transmission part generates first input transmission data (first data frame), including the first device data obtained by the first device data input part and first input safety communication data for determining a communication result. The input transmission part generates second input transmission data (second data frame), including the second device data obtained by the second device data input part and second input safety communication data for determining a communication result. The input transmission part transmits the first input transmission data and the second input transmission data to the control apparatus.

The control apparatus includes a control receiving part (BCM_NW control block 121), a first control determination part (first arithmetic block 124), a first control arithmetic part (first arithmetic block 124), a second control determination part (second arithmetic block 125), a second control arithmetic part (second arithmetic block 125), and a control transmission part (BCM_NW control block 121).

The control receiving part receives the first input transmission data and the second input transmission data which are transmitted from the input transmission apparatus.

The first control determination part determines whether communication of the first device data included in the first input transmission data has been performed properly, based on the first input safety communication data included in the first input transmission data received by the control receiving part.

Upon being determined that the communication of the first device data has been performed properly, the first control arithmetic part generates first control data to specify control based on the first device data. Upon being determined that the communication of the first device data has not been performed properly, the first control arithmetic part that generates first control data to specify fail-safe control which is predetermined.

The second control determination part determines whether communication of the second device data included in the second input transmission data has been performed properly, based on the second input safety communication data included in the second input transmission data received by the control receiving part.

Upon being determined that the communication of the second device data has been performed properly, the second control arithmetic part generates second control data to specify control based on the second device data. Upon being determined that the communication of the second device data has not been performed properly, the second control arithmetic part generates second control data to specify the fail-safe control.

The control transmission part generates first control transmission data (first control frame) including the first control data generated by the first control arithmetic part. The control transmission part generates second control transmission data (second control frame) including the second control data generated by the second control arithmetic part. The control transmission part transmits the first control transmission data and the second control transmission data to the output transmission apparatus.

The output transmission apparatus includes an output receiving part (output NW control block 131) and a device control data output part (reference numerals "132" through "136").

The output receiving part receives the first control transmission data and the second control transmission data which are transmitted from the control apparatus.

The device control data output part outputs device control data for controlling a device to be controlled (output device) which is installed in the vehicle, based on the first control data included in the first control transmission data received by the output receiving part and the second control data included in the second control transmission data received by the output receiving part.

The device control data output part includes a first output determination part (first output control block 134), a first output arithmetic part (first output control block 134), a second output determination part (second output control block 135), a second output arithmetic part (second output control block 135), and a matching output part (matching circuit 136).

The first output determination part determines whether communication of the first control data included in the first control transmission data has been performed properly, based on the first control safety communication data included in the first control transmission data received by the output receiving part.

Upon being determined that the communication of the first control data has been performed properly, the first output arithmetic part outputs the first control data as first output data. Upon being determined that the communication of the first control data has not been performed properly, the first output arithmetic part outputs first output data to specify fail-safe control which is predetermined.

The second output determination part determines whether communication of the second control data included in the second control transmission data has been performed properly, based on the second control safety communication data included in the second control transmission data received by the output receiving part.

Upon being determined that the communication of the second control data has been performed properly, the second output arithmetic part outputs the second control data as second output data. Upon being determined that the communication of the second control data has not been performed properly, the second output arithmetic part outputs second output data to specify the fail-safe control.

The matching output part obtains the first output data outputted by the first output arithmetic part and the second output data outputted by the second output arithmetic part, and outputs the device control data based on the first output data and the second output data.

The in-vehicle communication system includes a feedback transmission apparatus (confirmation DHM 140).

The feedback transmission apparatus includes a feedback input part (confirmation input control block 141) and a feedback transmission part (confirmation NW control block 143).

The feedback input part obtains, as feedback data, at least of either one of the device control data which is outputted from the output transmission apparatus, and data which is outputted as device status data from the device to be controlled which operates based on the device control data, the device status data representing an operating status of the device to be controlled.

The feedback transmission part transmits to the control apparatus the feedback data obtained by the feedback input part.

The control apparatus includes a first confirmation determination part (first arithmetic block 124).

The control receiving part receives the feedback data transmitted from the feedback transmission apparatus.

Based on the feedback data received by the control receiving part, the first confirmation determination part determines whether control specified by the first control data has been performed.

Upon determining that the control specified by the first control data has not been performed, the first confirmation determination part outputs failure notification data (error notification data) to notify that a failure has occurred.

The control apparatus includes a second confirmation determination part (second arithmetic block 125).

Based on the feedback data received by the control receiving part, the second confirmation determination part determines whether control specified by the second control data has been performed.

Upon determining that the control specified by the second control data has not been performed, the second confirmation determination part outputs the failure notification data.

Second Embodiment

An embodiment will be described according to which the first arithmetic block 124 and the second arithmetic block 125 of the BCM 120 compare pieces of control data which are generated by each other.

In the following, differences from the first embodiment will be mainly described. Description will be omitted for what is the same as in the first embodiment.

Figure 9:
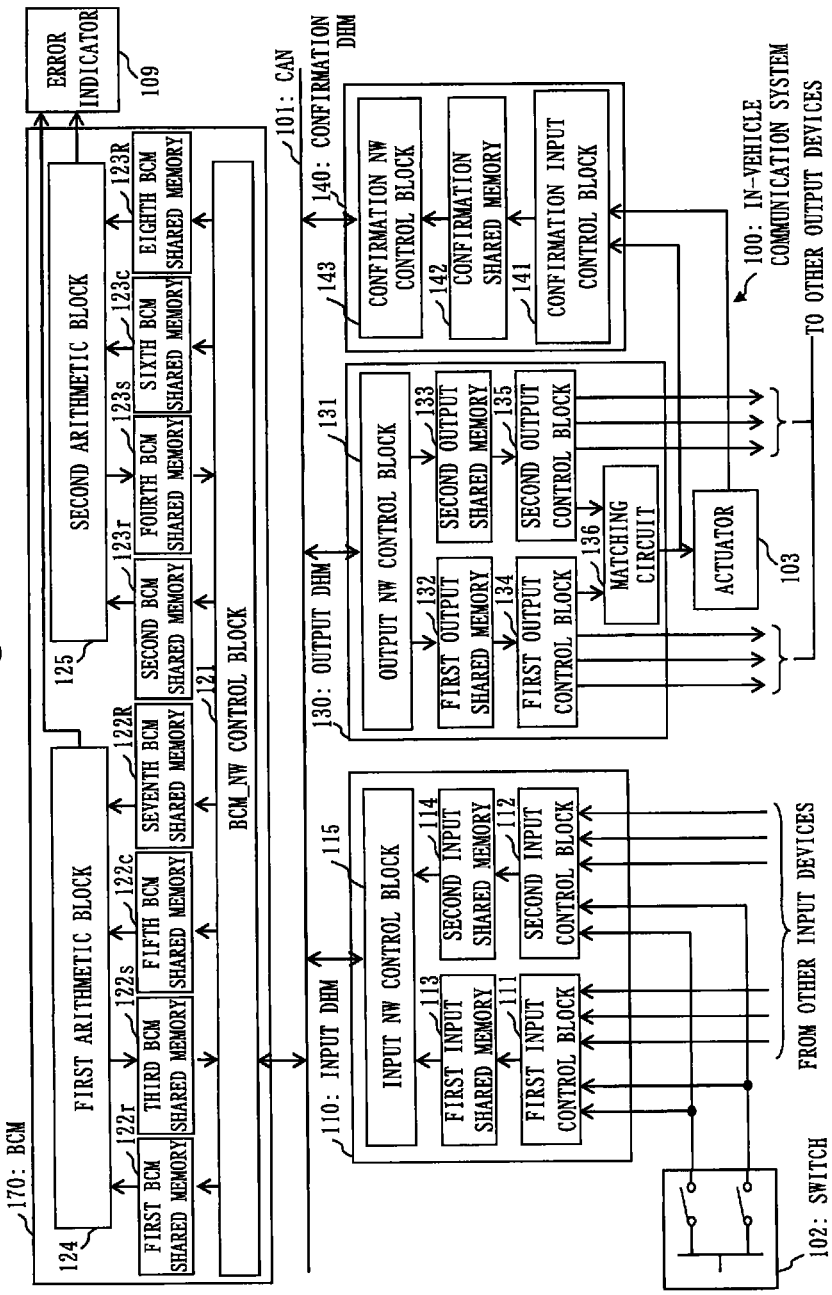
FIG. 9 is a configuration diagram of the in-vehicle communication system 100 according to a second embodiment.

FIG. 9 is a configuration diagram of the in-vehicle communication system 100 according to a second embodiment.

With reference to FIG. 9, the configuration of the in-vehicle communication system 100 according to the second embodiment will be described.

The configurations of the input DHM 110, the output DHM 130, and the confirmation DHM 140 of the in-vehicle communication system 100 are the same as the configurations described in the first embodiment (see FIG. 1).

The BCM 120 of the in-vehicle communication system 100 includes a seventh BCM shared memory 122R and an eighth BCM shared memory 123R, in addition to the configuration described in the first embodiment.

The seventh BCM shared memory 122R and the eighth BCM shared memory 123R are reference memories which are used by the first arithmetic block 124 and the second arithmetic block 125, respectively, to compare pieces of control data of each other.

The in-vehicle communication method of the in-vehicle communication system 100 is the same as that in the first embodiment (see FIG. 2 through FIG. 7). However, the processes of the BCM 120 are partially different.

Figure 10:
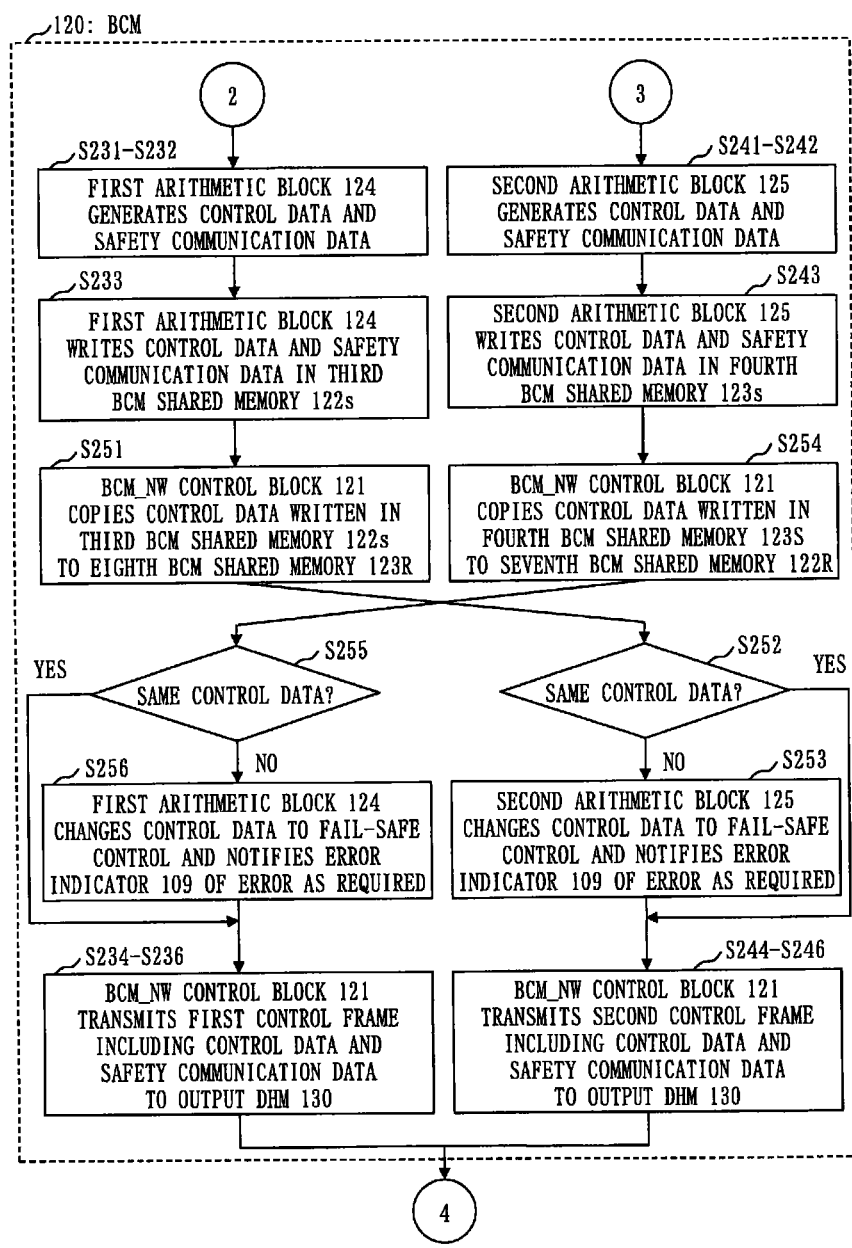
FIG. 10 is a flowchart illustrating part of the in-vehicle communication method of the in-vehicle communication system 100 according to the second embodiment.

FIG. 10 is a flowchart illustrating part of the in-vehicle communication method of the in-vehicle communication system 100 according to the second embodiment. FIG. 10 is the flowchart in which S251 through S256 are added to FIG. 4 described in the first embodiment.

With reference to FIG. 10, the processes (S251 through S256) of the BCM 120 which are different from those in the first embodiment will be described.

S231 through S233 and S241 through S243 are the processes described in the first embodiment (see FIG. 4).

After S233, processing proceeds to S251. After S243, processing proceeds to S254.

In S251, the BCM_NW control block 121 copies the control data written in the third BCM shared memory 122s in S233 to the eighth BCM shared memory 123R.

After S251, processing proceeds to S252.

In S252, the second arithmetic block 125 reads the control data from the eighth BCM shared memory 123R, and compares the read control data and the control data written in the fourth BCM shared memory 123s in S243. That is, the second arithmetic block 125 compares the control data generated by itself and the control data generated by the first arithmetic block 124.

If these pieces of the control data indicate the same value (YES), processing proceeds to S244.

If these pieces of the control data indicate different values (NO), processing proceeds to S253.

In S253, the second arithmetic block 125 determines whether the control data written in the fourth BCM shared memory 123s in S243 is the control data to specify the regular control according to the device data.

If the control data is the data to specify the regular control, the second arithmetic block 125 generates control data to specify the fail-safe control, and overwrites the fourth BCM shared memory 123s with the generated control data. That is, the second arithmetic block 125 changes the control data for the regular control to the control data for the fail-safe control. The second arithmetic block 125 notifies the error indicator 109 of an error (the same as in S225 in FIG. 3).

After S253, processing proceeds to S244. S244 through S246 are the processes described in the first embodiment (see FIG. 4).

S254 through S256 are the processes which are performed with respect to the first arithmetic block 124 in the same manner as in S251 through S253.

That is, the BCM_NW control block 121 copies the control data written in the fourth BCM shared memory 123s to the seventh BCM shared memory 122R (S254). The first arithmetic block 124 compares the control data generated by itself and the control data generated by the second arithmetic block 125 (S255). If these pieces of the control data are different, the first arithmetic block 124 changes the control data to the control data for the fail-safe control and notifies the error indicator 109 of an error, as required (S256). After S256, processing proceeds to S234. S234 through S236 are the processes described in the first embodiment (see FIG. 4).

Error notification to the error indicator 109 may be performed by either of the first arithmetic block 124 and the second arithmetic block 125 according to a predetermined arrangement.

The second embodiment has been described according to which the first arithmetic block 124 and the second arithmetic block 125 of the BCM 120 compare pieces of control data which are generated by each other.

If the pieces of control data of each other are different, this means that a malfunction has occurred in any one of the duplexed components for input (the input DHM 110)

through arithmetic (the BCM 120). That is, according to the second embodiment, the accuracy of locating a malfunction can be enhanced.

The second embodiment may be an embodiment as described below.

In S251 and S255, the BCM_NW control block 121 copies the safety communication data as well as the control data.

In S252 and S254, using the safety communication data, each arithmetic block checks with the safety communication function whether an abnormal condition has occurred in the control data, separately from determining whether the pieces of the control data are the same.

If an abnormal condition has occurred in the control data, each arithmetic block changes the control data and notifies an error in S253 and S256 as required.

If an abnormal condition in the control data is detected by the safety communication function, this means that a malfunction has occurred in the BCM_NW control block 121 that copied the control data or in the arithmetic block that wrote the control data. That is, according to this embodiment, the accuracy of locating a malfunction can be enhanced.

Third Embodiment

An embodiment will be described according to which the components of the input DHM 110, the BCM 120, and the output DHM 130 described in the first and second embodiments are multiplexed using a plurality of microcomputers.

Figure 11:
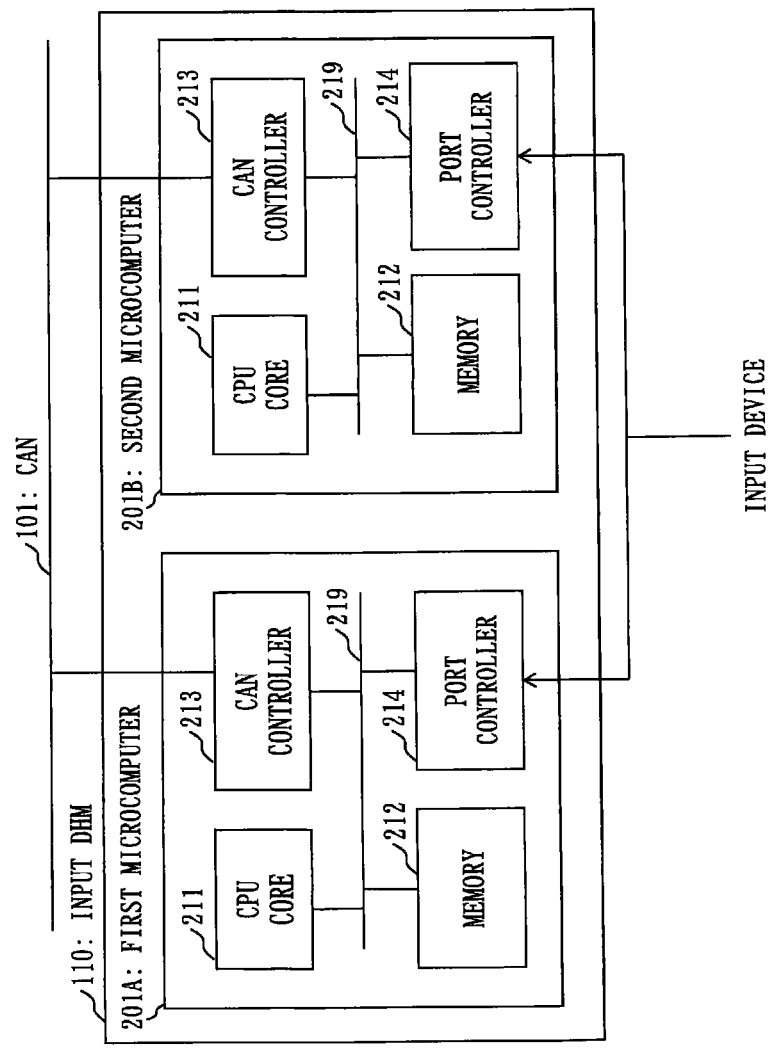
FIG. 11 is a hardware configuration diagram of an input DHM 110 according to a third embodiment.

FIG. 11 is a hardware configuration diagram of the input DHM 110 according to a third embodiment.

With reference to FIG. 11, the hardware configuration of the input DHM 110 according to the third embodiment will be described.

The input DHM 110 includes a first microcomputer 201A and a second microcomputer 201B.

Each of the first microcomputer 201A and the second microcomputer 201B includes a CPU core 211, a memory 212, a CAN controller 213, and a port controller 214. These are connected with one another through a bus 219 (internal bus).

The CPU core 211 is a processing unit that executes a program, controls other hardware components, and so on. The CPU core 211 will also be referred to simply as the CPU (Central Processing Unit).

The memory 212 is a storage unit that stores data.

The CAN controller 213 is a hardware component for performing data communication through the CAN 101.

The port controller 214 is a hardware component for input and output between devices.

The CPU core 211, the memory 212, and the port controller 214 of the first microcomputer 201A function as the first input control block 111 of the input DHM 110.

The memory 212 of the first microcomputer 201A functions as the first input shared memory 113 of the input DHM 110.

The CPU core 211, the memory 212, and the CAN controller 213 of the first microcomputer 201A function as the input NW control block 115 of the input DHM 110.

The CPU core 211, the memory 212, and the port controller 214 of the second microcomputer 201B function as the second input control block 112 of the input DHM 110.

The memory 212 of the second microcomputer 201B functions as the second input shared memory 114 of the input DHM 110.

The CPU core 211, the memory 212, and the CAN controller 213 of the second microcomputer 201B function as the input NW control block 115 of the input DHM 110.

Similarly to the input DHM 110, the output DHM 130 is implemented using two microcomputers.

Figure 12:
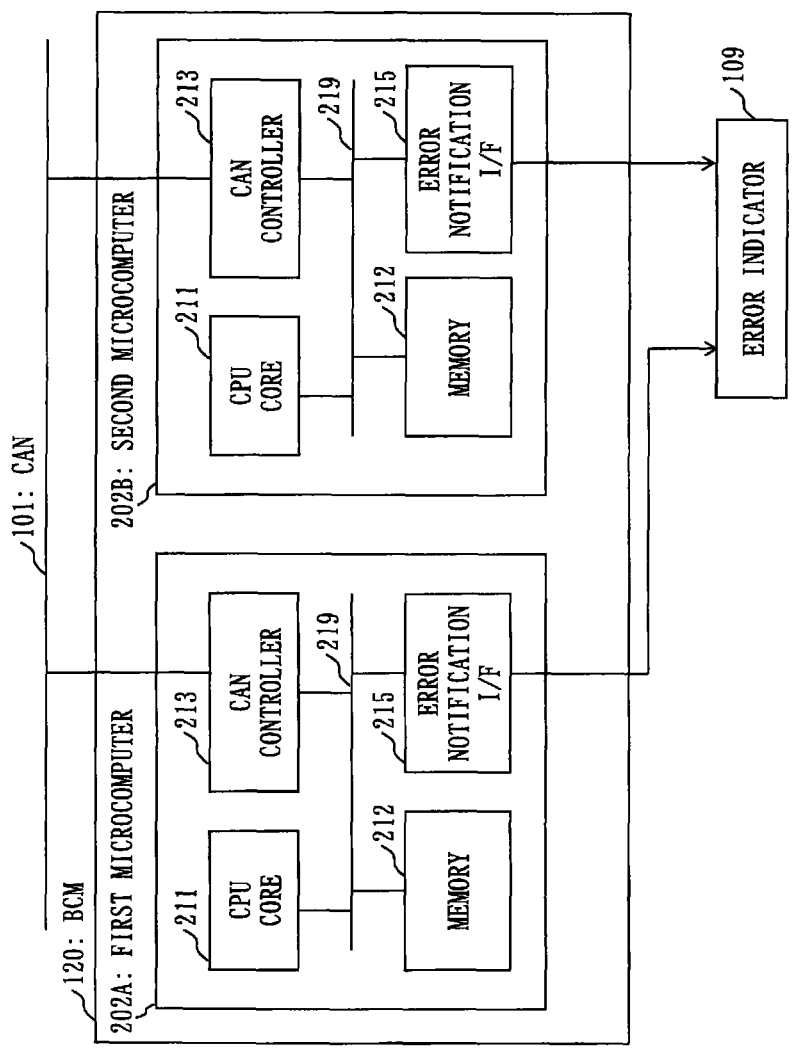
FIG. 12 is a hardware configuration diagram of a BCM 120 according to the third embodiment.

FIG. 12 is a hardware configuration diagram of the BCM 120 according to the third embodiment.

With reference to FIG. 12, the hardware configuration of the BCM 120 according to the third embodiment will be described.

The BCM 120 includes a first microcomputer 202A and a second microcomputer 202B.

Each of the first microcomputer 202A and the second microcomputer 202B includes a CPU core 211, a memory 212, a CAN controller 213, and an error notification I/F 215. These are connected with one another through a bus 219 (internal bus).

The error notification IN 215 is a hardware component having an interface (IN) for notifying the error indicator 109 of an error.

The CPU core 211, the memory 212, and the CAN controller 213 of the first microcomputer 202A function as the BCM_NW control block 121 of the BCM 120.

The memory 212 of the first microcomputer 202A functions as the first BCM shared memory 122r, the third BCM shared memory 122s, and the fifth BCM shared memory 122c.

The CPU core 211, the memory 212, and the error notification I/F 215 of the first microcomputer 202A function as the first arithmetic block 124 of the BCM 120.

The CPU core 211, the memory 212, and the CAN controller 213 of the second microcomputer 202B function as the BCM_NW control block 121 of the BCM 120.

The memory 212 of the second microcomputer 202B functions as the second BCM shared memory 123r, the fourth BCM shared memory 123s, and the sixth BCM shared memory 123c.

The CPU core 211, the memory 212, and the error notification I/F 215 of the second microcomputer 202B function as the second arithmetic block 125 of the BCM 120.

As described with reference to FIG. 11 and FIG. 12, by implementing duplexed channels using physically separate microcomputers, it is possible to prevent a failure in one of the channels from affecting the other channel.

If a failure occurs in a circuit that generates power to be supplied to each microcomputer or in a crystal oscillator that supplies a clock, communication cannot be performed, so that the other communicating party can detect a malfunction using the safety communication function. For this reason, it is not necessary to provide these circuits for each channel, and these circuits may be provided commonly for the both channels.

Fourth Embodiment

An embodiment will be described according to which the components of the input DHM 110, the BCM 120, and the output DHM 130 described in the first and second embodiments are multiplexed using a single microcomputer.

Figure 13:
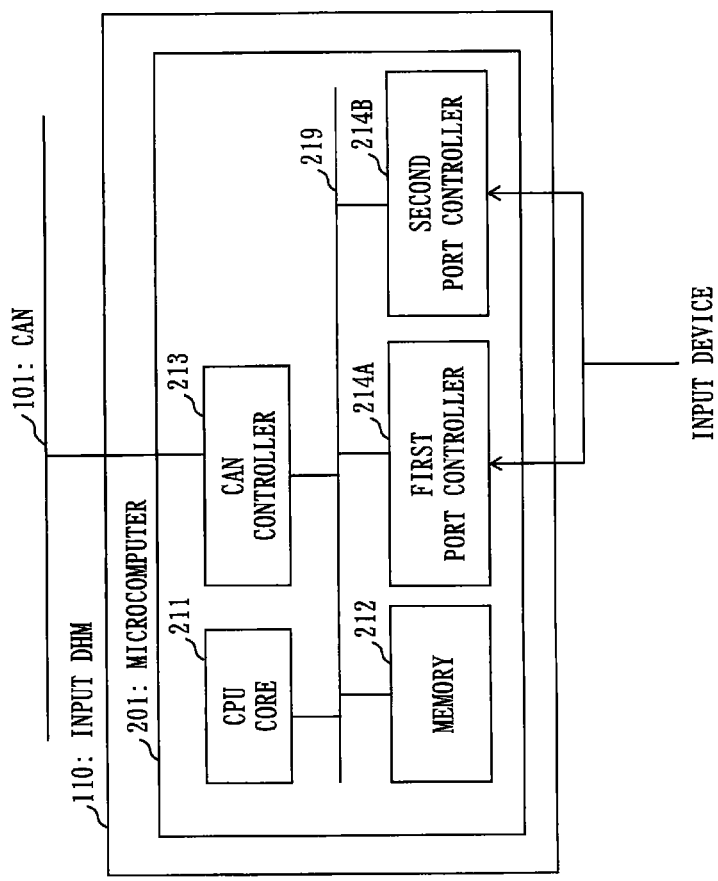
FIG. 13 is a hardware configuration diagram of the input DHM 110 according to a fourth embodiment.

FIG. 13 is a hardware configuration diagram of the input DHM 110 according to a fourth embodiment.

With reference to FIG. 13, the hardware configuration of the input DHM 110 according to the fourth embodiment will be described.

The input DHM 110 includes a microcomputer 201.

The microcomputer 201 includes a CPU core 211, a memory 212, a CAN controller 213, a first port controller 214A, and a second port controller 214B. These are connected with one another through a bus 219 (internal bus). These hardware components are the same as those in the third embodiment.

The CPU core 211, the memory 212, and the first port controller 214A function as the first input control block 111 of the input DHM 110.

The CPU core 211, the memory 212, and the second port controller 214B function as the second input control block 112 of the input DHM 110.

Each of the first input control block 111 and the second input control block 112 is implemented with an independent task in a multitasking environment, and a memory space in the memory 212 used by each task is protected with a memory protection function. By logically separating the first and second channels in this way, even if a runaway condition occurs in a program controlling either of the first and second channels, the other channel can be prevented from being affected.

The controller of each of the first channel and the second channel is composed of a separate hardware component. This is because if both of the port controllers are implemented with a single hardware component and a fault occurs such that the interface portion of the internal bus is damaged causing the input and output to be fixed, incorrect values may be inputted to and outputted from both of the channels. Such a phenomenon can be prevented by implementing the port controller as a physically duplexed pair.

The memory 212 functions as the first input shared memory 113 and the second input shared memory 114 of the input DHM 110.

Each of the first input shared memory 113 and the second input shared memory 114 is implemented as a shared memory that is managed by a task of the first channel and the second channel, respectively. Each shared memory is protected so as to be prevented from being accessed by a task of the other channel.

The CPU core 211, the memory 212, and the CAN controller 213 function as the input NW control block 115 of the input DHM 110.

Similarly to the input DHM 110, the output DHM 130 is implemented using a single microcomputer.

Figure 14:
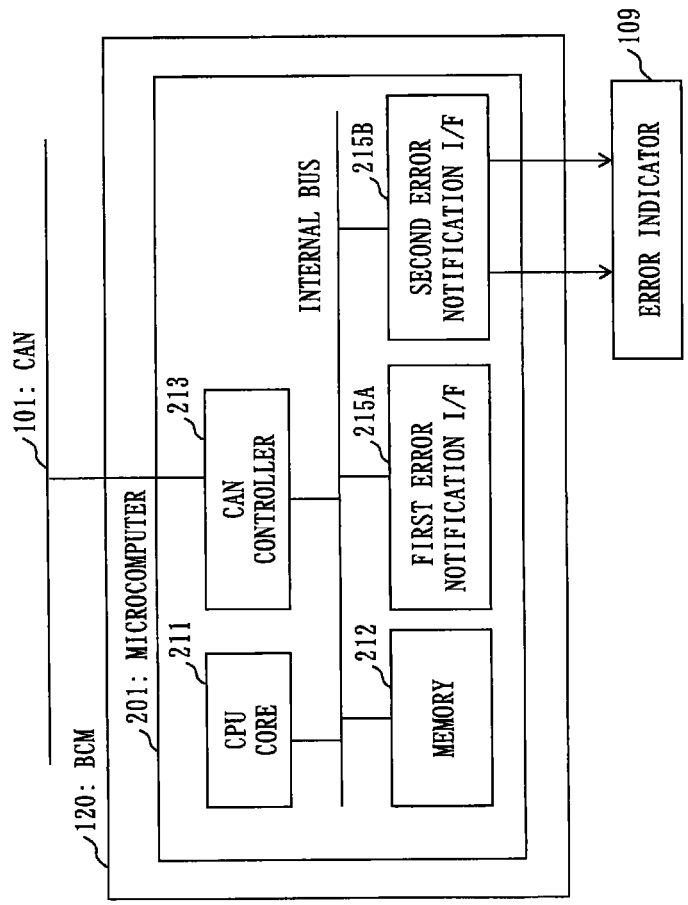
FIG. 14 is a hardware configuration diagram of the BCM 120 according to the fourth embodiment.

FIG. 14 is a hardware configuration diagram of the BCM 120 according to the fourth embodiment.

With reference to FIG. 14, the hardware configuration of the BCM 120 according to the fourth embodiment will be described.

The BCM 120 includes a microcomputer 201.

The microcomputer 201 includes a CPU core 211, a memory 212, a CAN controller 213, a first error notification I/F 215A, and a second error notification I/F 215B. These are connected with one another through a bus 219 (internal bus). These hardware components are the same as those in the third embodiment.

The CPU core 211, the memory 212, and the CAN controller 213 function as the BCM_NW control block 121 of the BCM 120.

The memory 212 functions as the first BCM shared memory 122r, the third BCM shared memory 122s, and the fifth BCM shared memory 122c.

Similarly to the input DHM 110 described with reference to FIG. 13, each shared memory is managed by a task of each channel, and each shared memory is protected so as to be prevented from being accessed by a task of the other channel.

The CPU core 211, the memory 212, and the first error notification I/F 215A function as the first arithmetic block 124 of the BCM 120.

The CPU core 211, the memory 212, and the second error notification I/F 215B function as the second arithmetic block 125 of the BCM 120.

Similarly to the input control block described with reference to FIG. 13, memory spaces of the arithmetic blocks are implemented as a logically duplexed pair. Similarly to the port controller of the input DHM 110, the error notification OF is implemented as a physically duplexed pair.

It is not necessary to provide a circuit that generates power to be supplied to the microcomputer and a crystal oscillator that supplies a clock for each channel, and these circuits may be provided commonly for the both channels, as in the third embodiment.

According to the fourth embodiment, a system with a high level of security can be constructed using a single microcomputer. Further, a highly flexible system can be constructed at low cost.

Fifth Embodiment

An embodiment will be described according to which each of the input DHM 110, the BCM 120, the output DHM 130 described in the first and second embodiments is implemented using a hardware engine.

A hardware engine is a device in which a plurality of hardware components are incorporated. An LSI (Large Scale Integration) is an example of a hardware engine.

Figure 15:
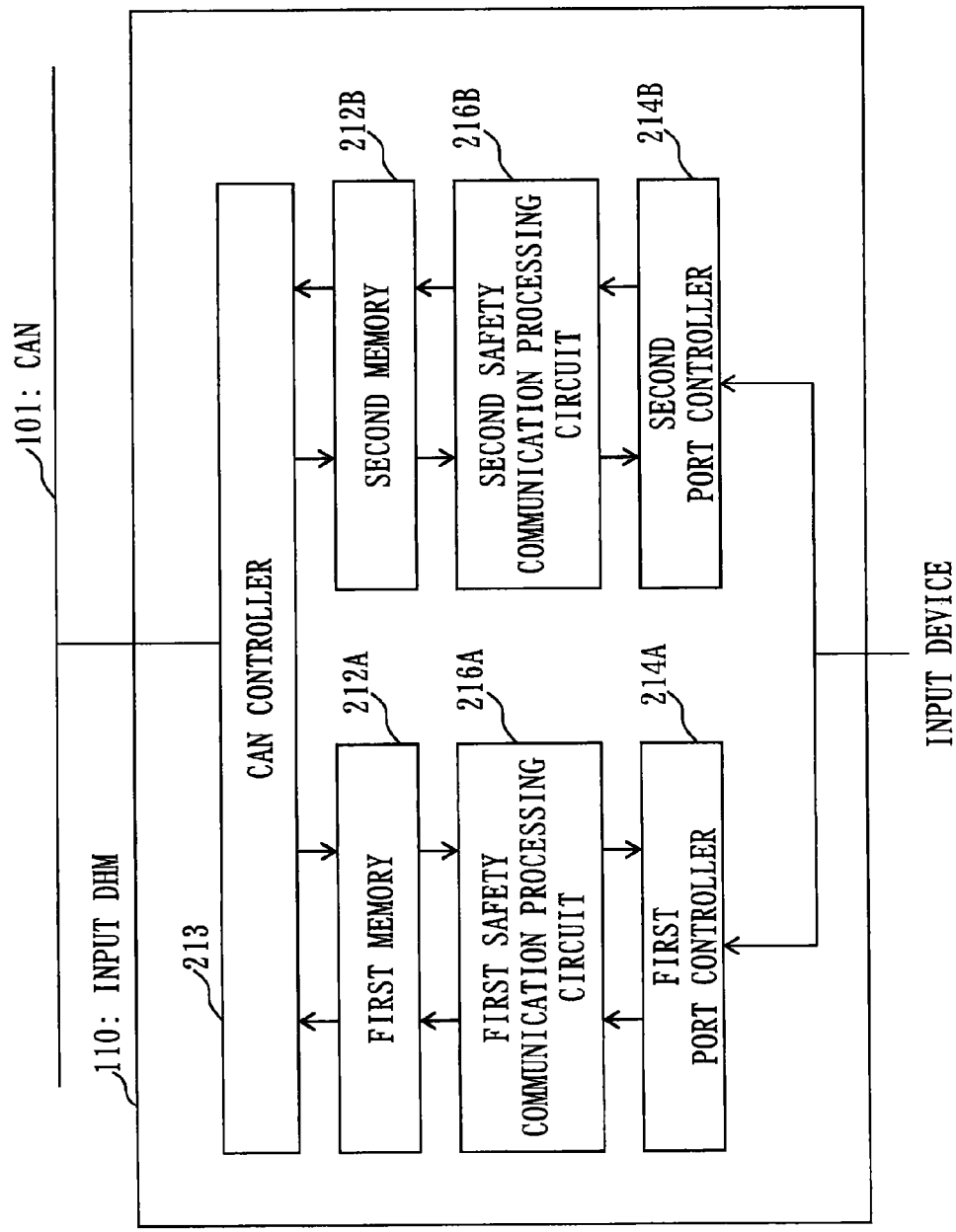
FIG. 15 is a hardware configuration diagram of the input DHM 110 according to a fifth embodiment.

FIG. 15 is a hardware configuration diagram of the input DHM 110 according to a fifth embodiment.

With reference to FIG. 15, the hardware configuration of the input DHM 110 according to the fifth embodiment will be described.

The input DHM 110 includes a first port controller 214A, a second port controller 214B, a first safety communication processing circuit 216A, a second safety communication processing circuit 216B, a first memory 212A, a second memory 212B, and a CAN controller 213.

Each safety communication processing circuit is a circuit for generating safety communication data and determining with the safety communication function whether a malfunction has occurred. Each error notification I/F is a circuit having an interface (I/F) for communicating with the error indicator 109. The rest of the hardware components are the same as those in the third embodiment.

The first port controller 214A and the first safety communication processing circuit 216A function as the first input control block 111 of the input DHM 110.

The second port controller 214B and the second safety communication processing circuit 216B function as the second input control block 112 of the input DHM 110.

The first memory 212A functions as the first input shared memory 113 of the input DHM 110.

The second memory 212B functions as the second input shared memory 114 of the input DHM 110.

The CAN controller 213 functions as the input NW control block 115 of the input DHM 110.

The output DHM 130 is implemented similarly to the input DHM 110.

Figure 16:
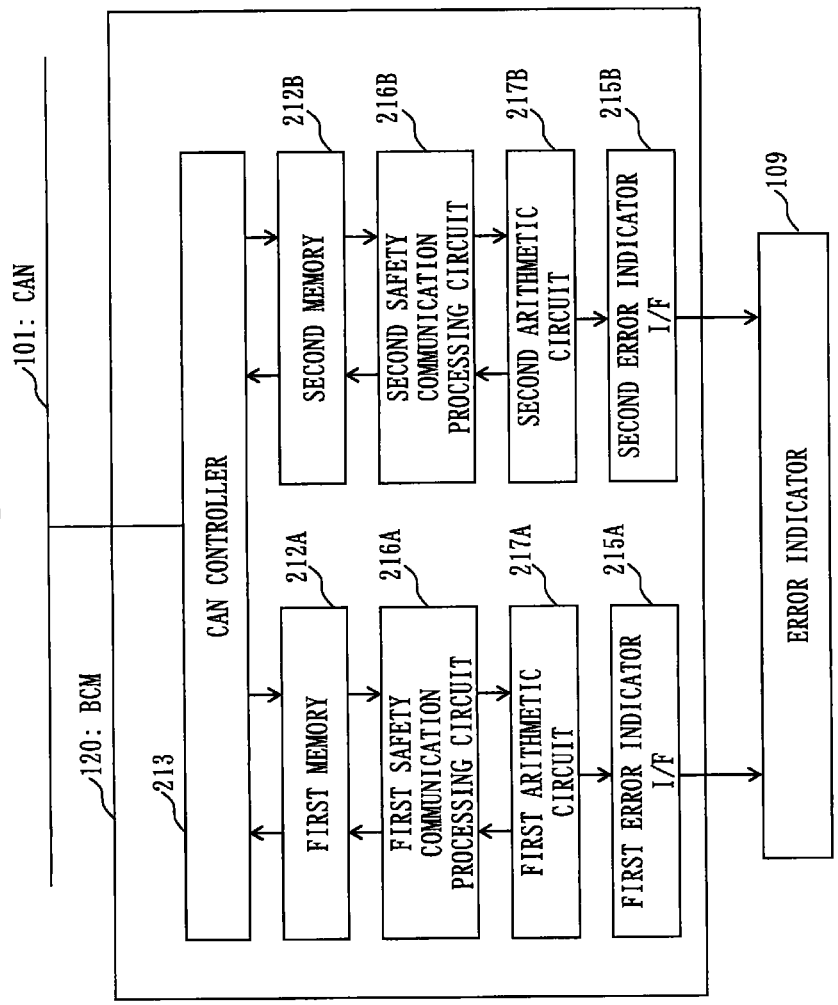
FIG. 16 is a hardware configuration diagram of the BCM 120 according to the fifth embodiment.

FIG. 16 is a hardware configuration diagram of the BCM 120 according to the fifth embodiment.

With reference to FIG. 16, the hardware configuration of the BCM 120 according to the fifth embodiment will be described.

The BCM 120 includes a CAN controller 213, a first memory 212A, a second memory 212B, a first safety communication processing circuit 216A, a second safety communication processing circuit 216B, a first arithmetic circuit 217A, a second arithmetic circuit 217B, a first error notification I/F 215A, and a second error notification I/F 215B.

Each safety communication processing circuit is a circuit for generating safety communication data and determining with the safety communication function whether a malfunction has occurred. Each error indicator I/F is a circuit having an interface (I/F) for communicating with the error indicator 109. The rest of the hardware components are the same as those in the third embodiment The CAN controller 213 functions as the BCM_NW control block 121 of the BCM 120.

The first memory 212A functions as the first BCM shared memory 122r, the third BCM shared memory 122s, and the fifth BCM shared memory 122c of the BCM 120.

The second memory 212B functions as the second BCM shared memory 123r, the fourth BCM shared memory 123s, and the sixth BCM shared memory 123c of the BCM 120.

The first safety communication processing circuit 216A, the first arithmetic circuit 217A, and the first error notification I/F 215A function as the first arithmetic block 124 of the BCM 120.

The second safety communication processing circuit 216B, the second arithmetic circuit 217B, and the second error notification OF 215B function as the second arithmetic block 125 of the BCM 120.

According to the fifth embodiment, the input DHM 110, the BCM 120, and the output DHM 130 can be implemented with a very simple circuit (a single LSI, for example). Thus, a system with a high level of security can be constructed at very low cost.

The above embodiments may be implemented in combination partially or entirely as appropriate, provided that no inconsistencies arise.

REFERENCE SIGNS LIST

100: in-vehicle communication system, 101: CAN, 102: switch, 103: actuator, 109: error indicator, 110: input DHM, 111: first input control block, 112: second input control block, 113: first input shared memory, 114: second input shared memory, 115: input NW control block, 120: BCM, 121: BCM_NW control block, 122r: first BCM shared memory, 122s: third BCM shared memory, 122c: fifth BCM shared memory, 122R: seventh BCM shared memory, 123r: second BCM shared memory, 123s: fourth BCM shared memory, 123c: sixth BCM shared memory, 123R: eighth BCM shared memory, 124: first arithmetic block, 125: second arithmetic block, 130: output DHM, 131: output NW control block, 132: first output shared memory, 133: second output shared memory, 134: first output control block, 135: second output control block, 136: matching circuit, 140: confirmation DHM, 141: confirmation input control block, 142: confirmation shared memory, 143: confirmation NW control block, 150: DHM, 151: DHM_NW control block, 201: microcomputer, 201A: first microcomputer, 201B: second microcomputer, 202A: first microcomputer, 202B: second microcomputer, 211: CPU core, 212: memory, 212A: first memory, 212B: second memory, 213: CAN controller, 214: port controller, 214A: first port controller, 214B: second port controller, 215: error notification I/F, 215A: first error notification I/F, 215B: second error notification I/F, 216A: first safety communication processing circuit, 216B: second safety communication processing circuit, 217A: first arithmetic circuit, 217B: second arithmetic circuit, 219: bus

The invention claimed is:

1. An in-vehicle communication system comprising:
an input transmission apparatus including
a first device data input part that obtains, as first device data, data outputted from a device being installed in a vehicle;
a second device data input part that obtains, as second device data, the data; and
an input transmission part that transmits first input transmission data, including the first device data and first input safety communication data, and second input transmission data, including the second device data and second input safety communication data;
a control apparatus including
a first control determination part that determines whether communication of the first device data has been performed properly, using the first input safety communication data included in the first input transmission data;
a first control arithmetic part that, when the communication of the first device data has been performed properly, generates first control data by specifying control based on the first device data;
a second control determination part that determines whether communication of the second device data has been performed properly, using the second input safety communication data included in the second input transmission data;
a second control arithmetic part that, when the communication of the second device data has been performed properly, generates second control data by specifying control based on the second device data; and
a control transmission part that transmits first control transmission data including the first control data, and second control transmission data including the second control data; and
an output transmission apparatus including
an output receiving part that receives the first control transmission data and the second control transmission data; and
a device control data output part that outputs device control data for controlling a device to be controlled which is installed in the vehicle, based on the first control data and the second control data.

2. The in-vehicle communication system according to claim 1,
wherein the control apparatus includes
a control receiving part that receives the first input transmission data and the second input transmission data,
wherein when the communication of the first device data has not been performed properly, the first control arithmetic part generates the first control data by specifying fail-safe control,
wherein when the communication of the second device data has not been performed properly, the second control arithmetic part generates the second control data by specifying the fail-safe control,
wherein the first control transmission data includes the first control data and first control safety communication data,
wherein the second control transmission data includes the second control data and second control safety communication data, wherein the device control data output part of the output transmission apparatus includes a first output determination part that determines whether communication of the first control data has been performed properly, based on the first control safety communication data;

a first output arithmetic part that, when the communication of the first control data has been performed properly, outputs first output data by specifying the first control data, and when the communication of the first control data has not been performed properly, outputs first output data by specifying fail-safe control, a second output determination part that determines whether communication of the second control data has been performed properly, based on the second control safety communication data;

a second output arithmetic part that, when the communication of the second control data has been performed properly, outputs second output data by specifying the second control data, and when the communication of the second control data has not been performed properly, outputs second output data by specifying the fail-safe control; and a matching output part that outputs the device control data based on the first output data and the second output data.

3. The in-vehicle communication system according to claim 2, wherein when at least either one of the first output data and the second output data is data to specify the fail-safe control, the matching output part outputs the data to specify the fail-safe control as the device control data.

4. The in-vehicle communication system according to claim 1, wherein upon being determined that communication of the first input transmission data has not been performed properly, the first control determination part outputs communication failure data to notify that a failure has occurred, and wherein, upon being determined that communication of the second input transmission data has not been performed properly, the second control determination part outputs the communication failure data.

5. The in-vehicle communication system according to claim 1, wherein the input transmission apparatus includes a first input memory and a second input memory, wherein the first device data input part writes in the first input memory the first device data obtained, wherein the second device data input part writes in the second input memory the second device data obtained, and wherein the input transmission part reads the first device data from the first input memory; transmits data including the first device data read, as the first input transmission data; reads the second device data from the second input memory; and transmits data including the second device data read, as the second input transmission data.

6. The in-vehicle communication system according to claim 1, wherein the control apparatus includes a first receiving memory in which the first input transmission data is written, and a second receiving memory in which the second input transmission data is written, wherein the first control determination part reads the first input transmission data from the first receiving memory, and based on the first input transmission data read, determines whether communication of the first input transmission data has been performed properly, and wherein the second control determination part reads the second input transmission data from the second receiving memory, and based on the second input transmission data read, determines whether communication of the second input transmission data has been performed properly.

7. The in-vehicle communication system according to claim 1, wherein the control apparatus includes a first transmission memory and a second transmission memory, wherein the first control arithmetic part writes in the first transmission memory the first control data generated, wherein the second control arithmetic part writes in the second transmission memory the second control data generated, and wherein the control transmission part reads the first control data from the first transmission memory; transmits data including the first control data read, as the first control transmission data; reads the second control data from the second transmission memory; and transmits data including the second control data read, as the second control transmission data.

8. The in-vehicle communication system according to claim 1, wherein the output transmission apparatus includes a first output memory and a second output memory, wherein the output receiving part writes in the first output memory the first control transmission data received, and writes in the second output memory the second control transmission data received, and wherein the device control data output part reads the first control transmission data from the first output memory, reads the second control transmission data from the second output memory, and outputs the device control data based on the first control transmission data read and the second control transmission data read.

9. The in-vehicle communication system according to claim 1, further comprising a feedback transmission apparatus, the feedback transmission apparatus including a feedback input part that obtains, as feedback data, at least of either one of the device control data which is outputted from the output transmission apparatus, and data which is outputted as device status data from the device to be controlled which operates based on the device control data, the device status data representing an operating status of the device to be controlled; and a feedback transmission part that transmits to the control apparatus the feedback data obtained by the feedback input part.

10. The in-vehicle communication system according to claim 9, wherein the control apparatus includes a first confirmation determination part, wherein based on the feedback data transmitted from the feedback transmission apparatus, the first confirmation determination part determines whether control specified by the first control data has been performed, and wherein upon determining that the control specified by the first control data has not been performed, the first confirmation determination part outputs failure notification data to notify that a failure has occurred.

11. The in-vehicle communication system according to claim 10,
wherein the control apparatus includes a second confirmation determination part,
wherein based on the feedback data, the second confirmation determination part determines whether control specified by the second control data has been performed, and
wherein upon determining that the control specified by the second control data has not been performed, the second confirmation determination part outputs the failure notification data.

12. The in-vehicle communication system according to claim 1,
wherein the first control arithmetic part compares the first control data and the second control data, and when the first control data and the second control data are different, performs an error process.

13. The in-vehicle communication system according to claim 1,
wherein the input transmission apparatus includes a first input microcomputer that functions as the first device data input part, and a second input microcomputer that functions as the second device data input part, and
wherein the control apparatus includes a first control microcomputer that functions as the first control determination part and the first control arithmetic part, and a second control microcomputer that functions as the second control determination part and the second control arithmetic part.

14. The in-vehicle communication system according to claim 1,
wherein the input transmission apparatus includes an input microcomputer that functions as the first device data input part, the second device data input part, and the input transmission part,
wherein the control apparatus includes a control microcomputer that functions as the first control determination part, the first control arithmetic part, the second control determination part, the second control arithmetic part, and the control transmission part, and
wherein the output transmission apparatus includes an output microcomputer that functions as the output receiving part and the device control data output part.

15. The in-vehicle communication system according to claim 1,
wherein the input transmission apparatus includes a first device data input circuit that functions as the first device data input part, a second device data input circuit that functions as the second device data input part, and an input transmission circuit that functions as the input transmission part,
wherein the control apparatus includes a first control determination circuit that functions as the first control determination part, a first control arithmetic circuit that functions as the first control arithmetic part, a second control determination circuit that functions as the second control determination part, a second control arithmetic circuit that functions as the second control arithmetic part, and a control transmission circuit that functions as the control transmission part, and
wherein the output transmission apparatus includes an output receiving circuit that functions as the output receiving part, and a device control data output circuit that functions as the device control data output part.

16. An in-vehicle communication method comprising:
obtaining, as first device data, data outputted from a device being installed in a vehicle, by a first device data input part of an input transmission apparatus being installed in the vehicle;
obtaining the data as second device data, by a second device data input part of the input transmission apparatus;
transmitting first input transmission data, including the first device data and first input safety communication data, and second input transmission data, including the second device data and second input safety communication data, to a control apparatus being installed in the vehicle, by an input transmission part of the input transmission apparatus;
determining whether communication of the first device data has been performed properly, by a first control determination part of the control apparatus, using the first input safety communication data included in the first input transmission data;
generating, when the communication of the first device data has been performed properly, first control data by specifying control based on the first device data, by a first control arithmetic part of the control apparatus;
determining whether communication of the second device data has been performed properly, by a second control determination part of the control apparatus, using the second input safety communication data included in the second input transmission data,
generating, when the communication of the second device data has been performed properly, second control data by specifying control based on the second device data, by a second control arithmetic part of the control apparatus;
transmitting first control transmission data including the first control data, and second control transmission data including the second control data, to an output transmission apparatus being installed in the vehicle, by a control transmission part of the control apparatus;
receiving the first control transmission data and the second control transmission data, by an output receiving part of the output transmission apparatus; and
outputting device control data for controlling a device to be controlled which is installed in the vehicle, by a device control data output part of the output transmission apparatus, based on the first control data and the second control data.

* * * * *